(12) United States Patent
Teramachi

(10) Patent No.: US 6,626,572 B2
(45) Date of Patent: Sep. 30, 2003

(54) LINEAR ROLLER GUIDE DEVICE

(75) Inventor: Hiroshi Teramachi, Tokyo (JP)

(73) Assignee: THK Co., Ltd., Tokyo (JP)

( * ) Notice: Subject to any disclaimer, the term of this patent is extended or adjusted under 35 U.S.C. 154(b) by 0 days.

(21) Appl. No.: 09/771,966

(22) Filed: Jan. 30, 2001

(65) Prior Publication Data

US 2001/0016088 A1 Aug. 23, 2001

Related U.S. Application Data

(62) Division of application No. 09/029,322, filed as application No. PCT/JP97/01606 on May 13, 1997, now Pat. No. 6,217,217.

(30) Foreign Application Priority Data

May 13, 1996 (JP) .............................. 8-142253
May 13, 1996 (JP) .............................. 8-142256

(51) Int. Cl.[7] ............................................. F16C 29/06
(52) U.S. Cl. ........................................................ 384/44
(58) Field of Search .............................. 384/44, 45, 43; 464/168

(56) References Cited

U.S. PATENT DOCUMENTS 3,704,919 A * 12/1972 Titt .............................. 384/44

FOREIGN PATENT DOCUMENTS

| EP | 0 296 538 | 12/1988 |
|---|---|---|
| JP | 50-119829 | 9/1975 |
| JP | 51-156345 | 12/1976 |
| JP | 60-143225 | 7/1985 |
| JP | 63-91722 | 6/1988 |
| JP | 63-172016 | 7/1988 |
| JP | 64-26017 | 1/1989 |
| JP | 1-136716 | 9/1989 |
| JP | 2-142918 | 6/1990 |
| JP | 5-280537 | 10/1993 |
| JP | 7-317762 | 12/1995 |

* cited by examiner

*Primary Examiner*—Lenard A. Footland
(74) *Attorney, Agent, or Firm*—Armstrong, Westerman & Hattori, LLP

(57) ABSTRACT

A linear roller guide device in which the rollers smoothly circulate by integrally molding at least one member of the roller returning passage, the roller end surface guide wall and the direction changing portion with the block body. The roller returning passage and the direction changing passage inner periphery guide portion are provided with a roller chain guide portion for guiding a track of the roller chain onto a predetermined track. At least one of the roller returning passage forming member for forming the roller returning passage and the direction changing passage inner periphery portion forming member for forming the direction changing passage inner periphery portion is integrally molded by inserting the block body into a molding die.

4 Claims, 15 Drawing Sheets

FIG. 2
(a)
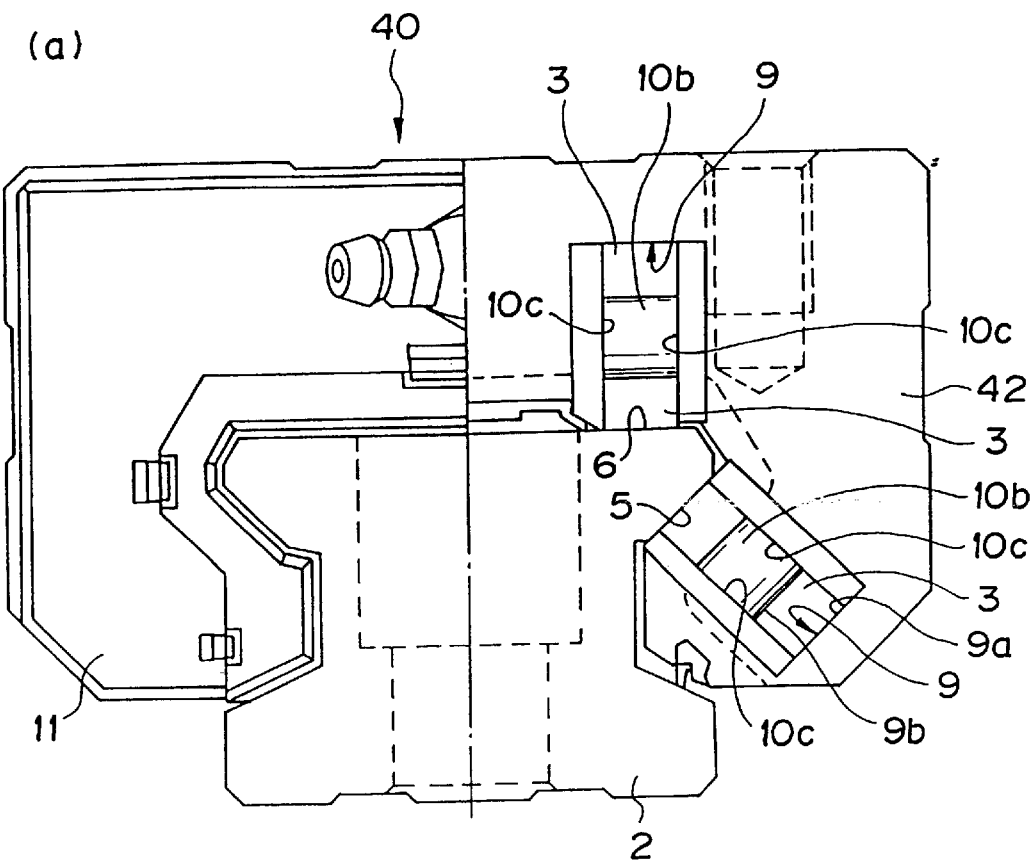
(b)
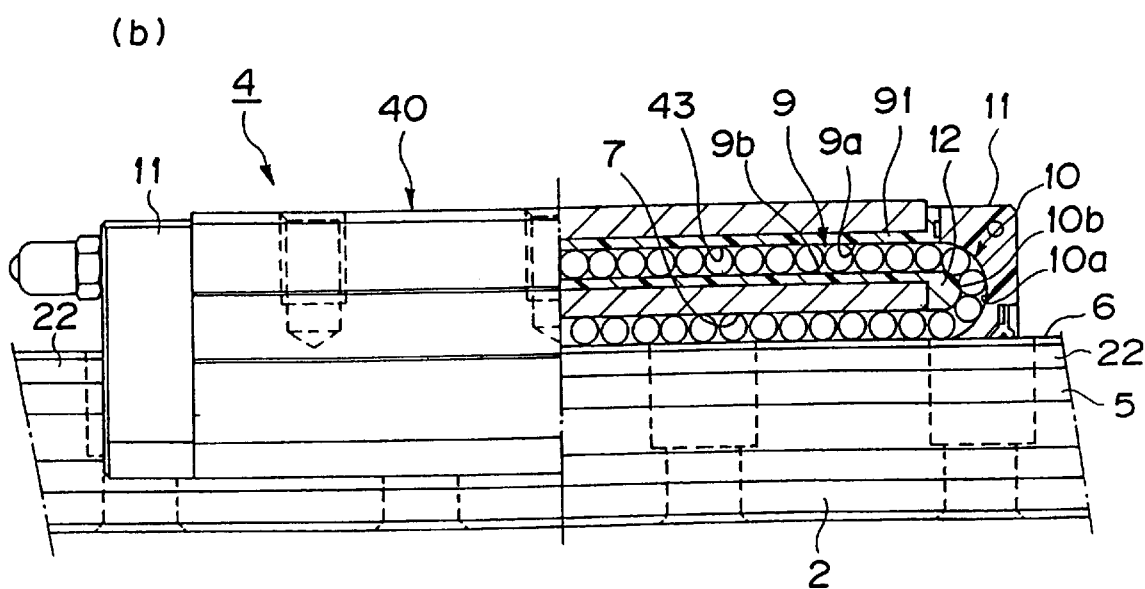

FIG. 7 (a)
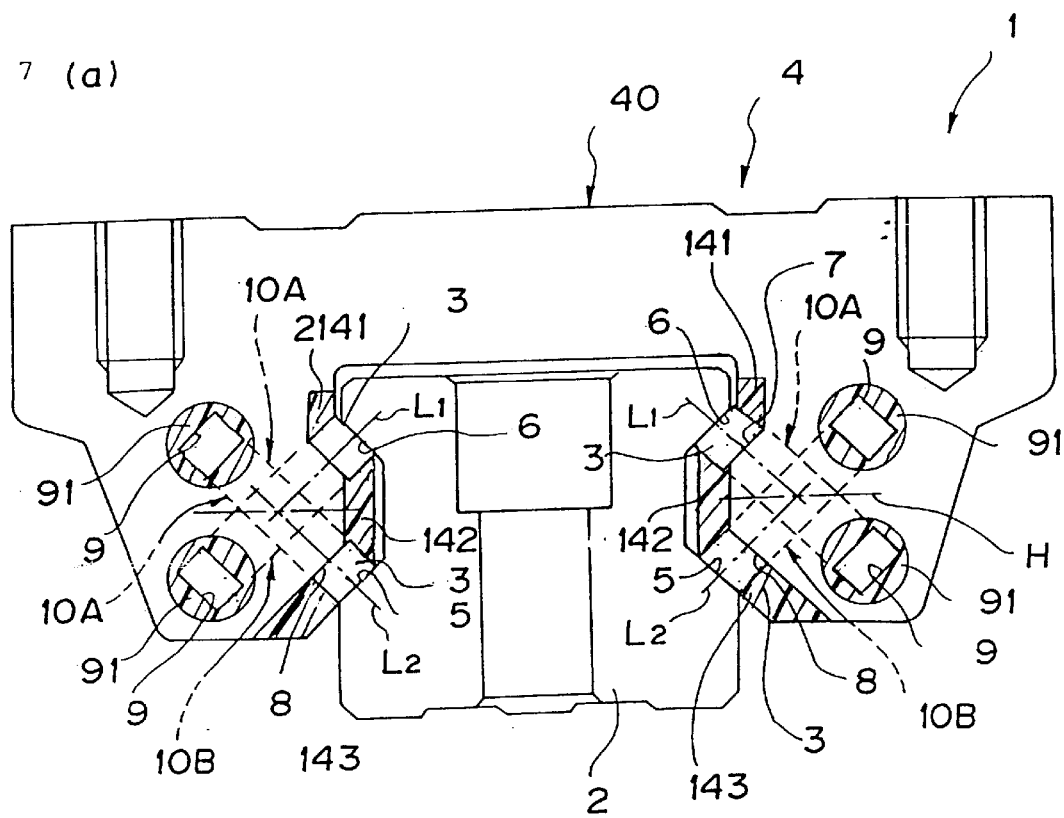
(b)
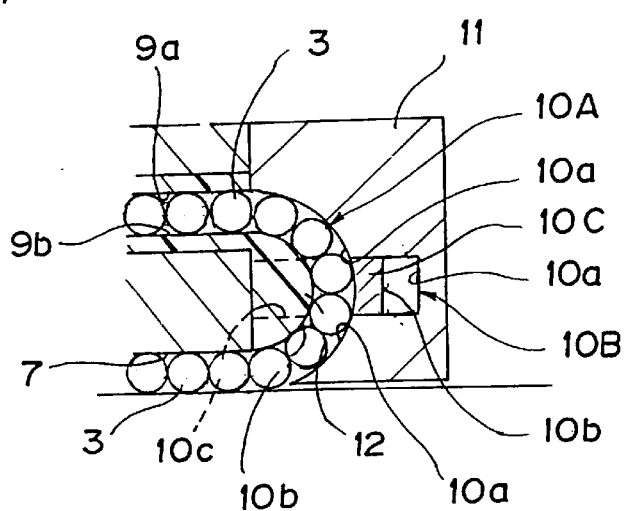

FIG. 8
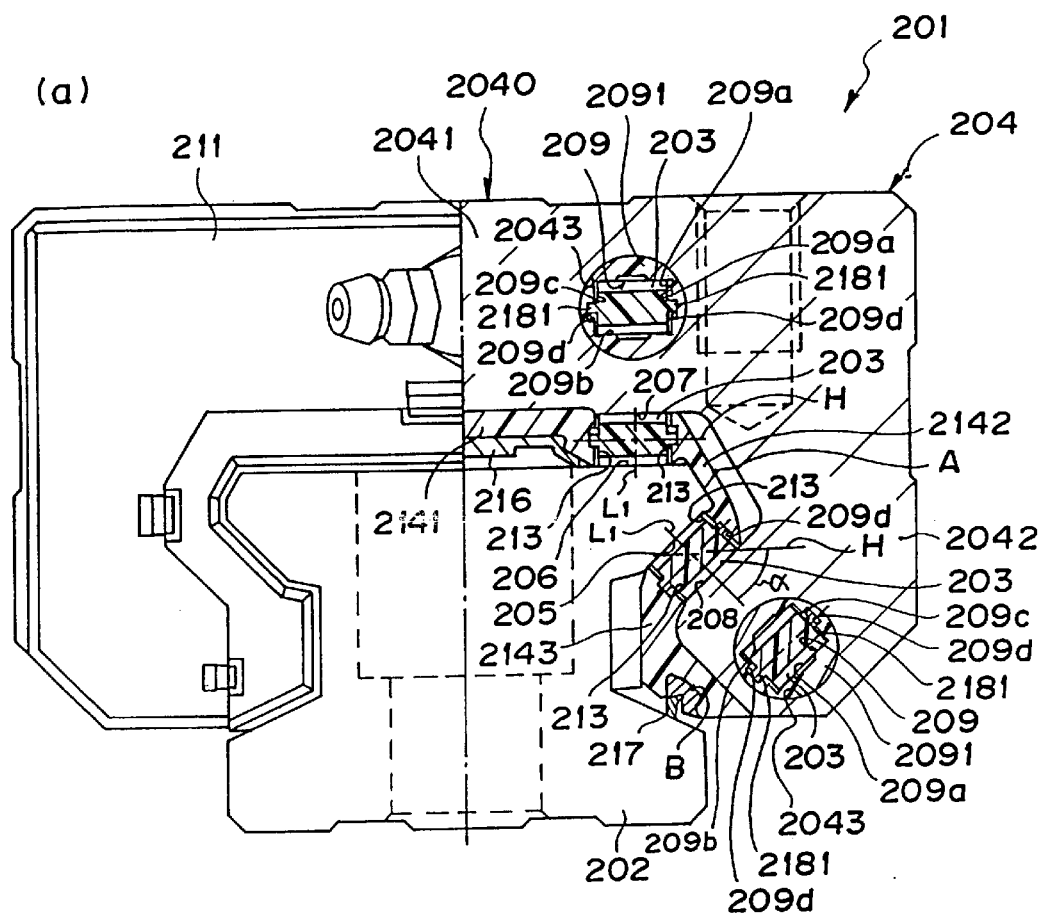
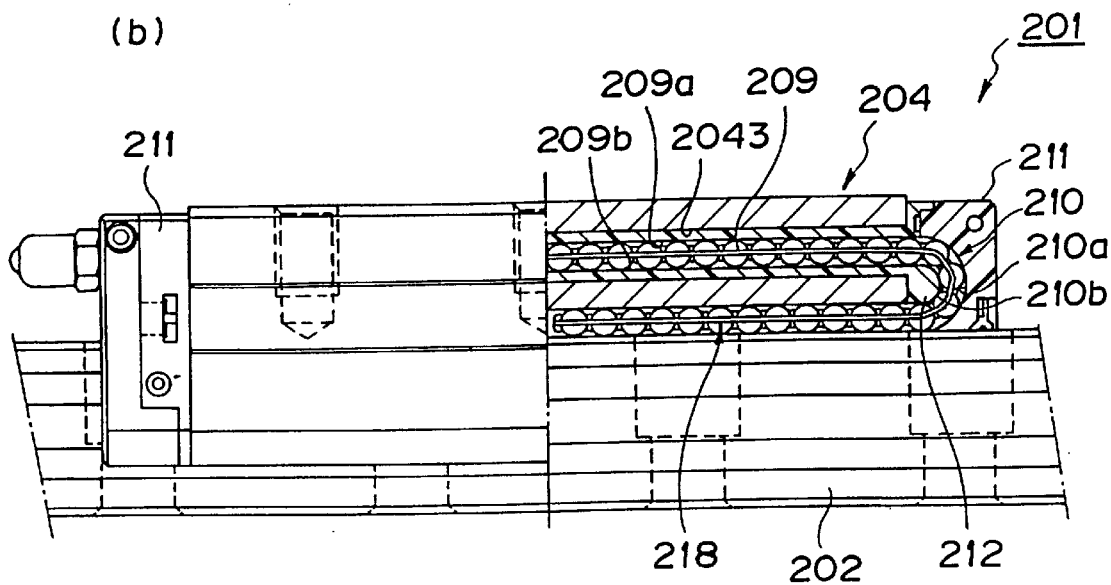

FIG. 9
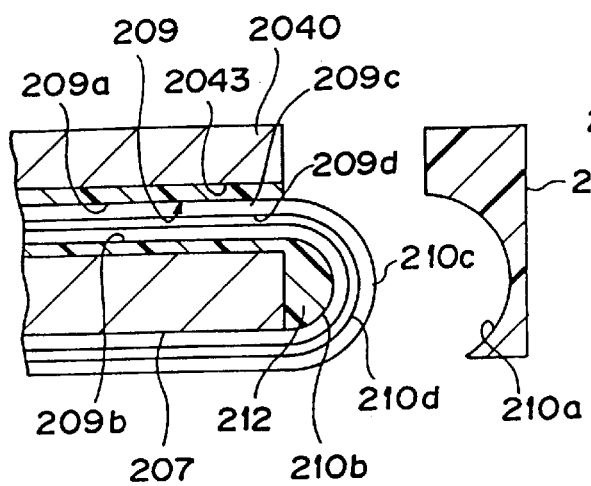
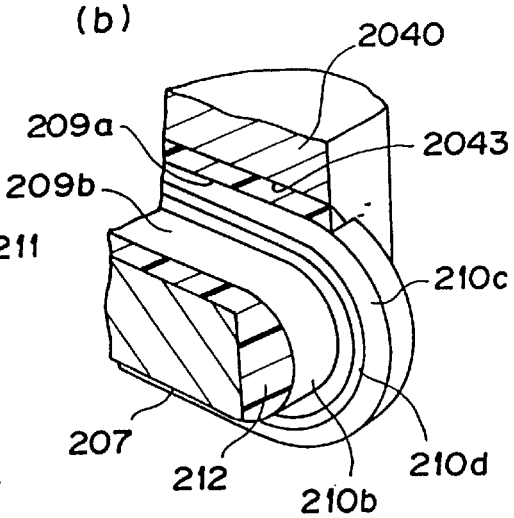
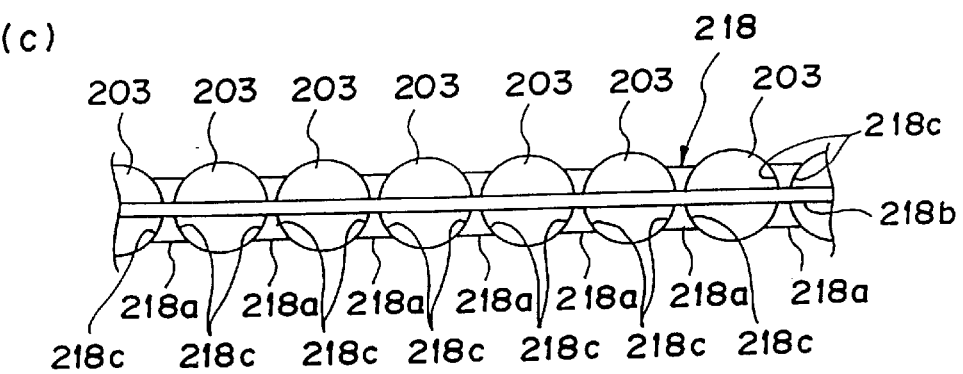
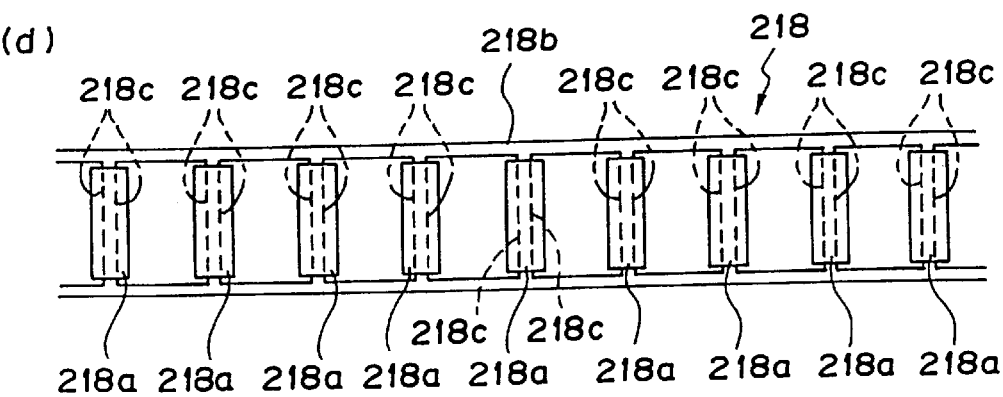
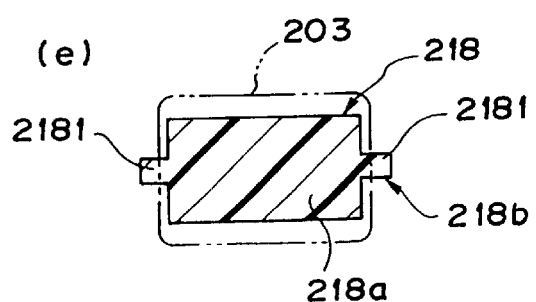

FIG. 10
(a)
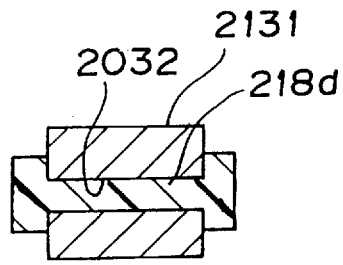
(b)
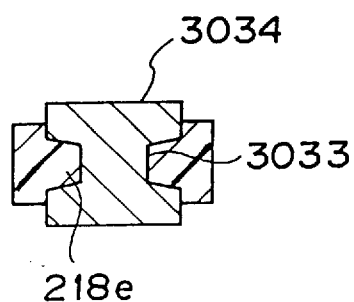
(c)
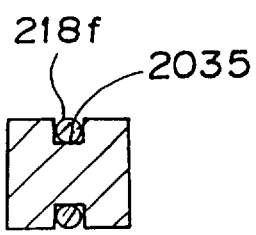
(d)
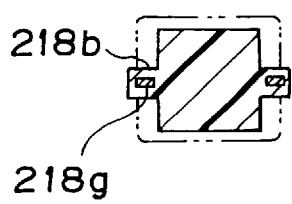

FIG. 14
(a)
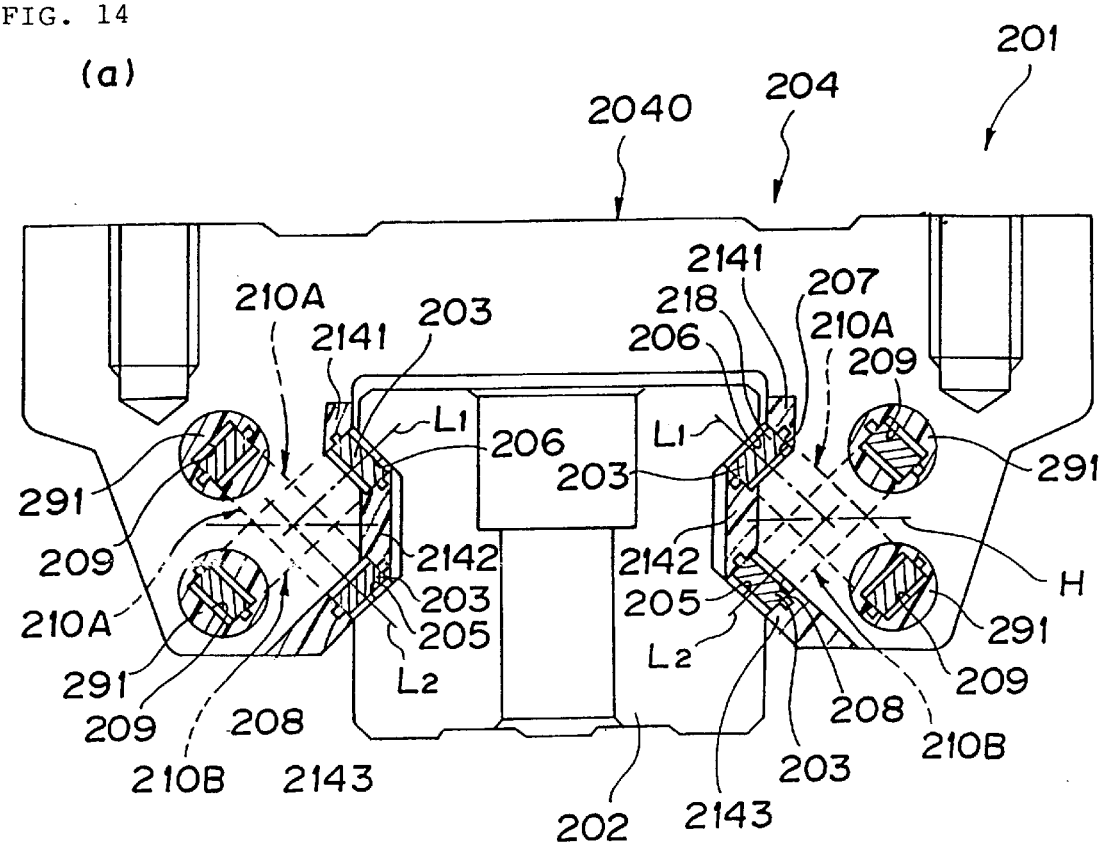
(b)
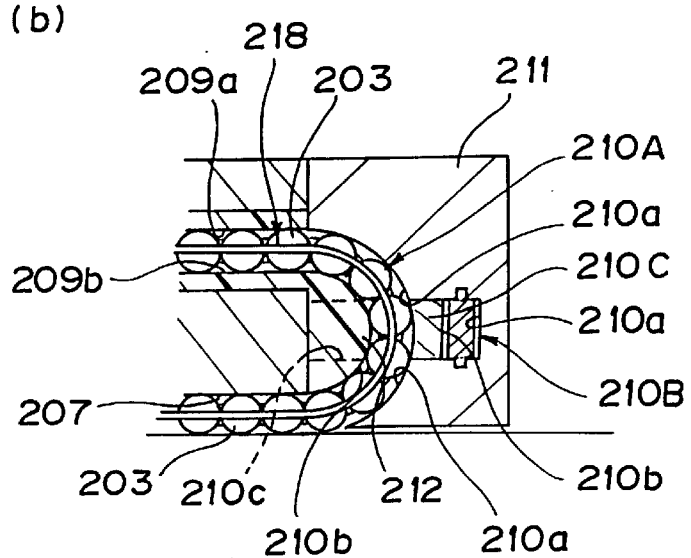

FIG. 15
(a)
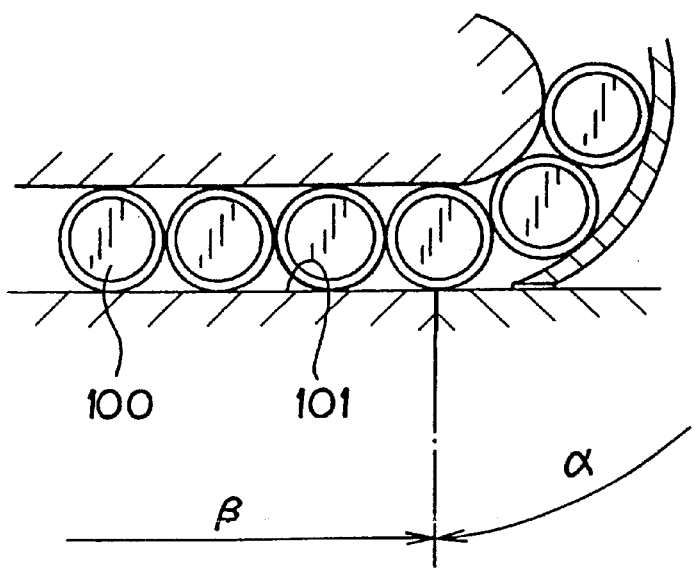
(b)
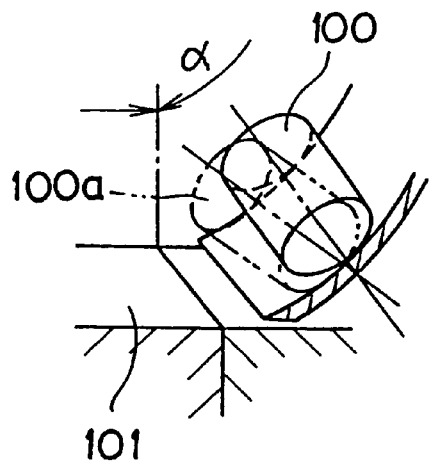
(c)
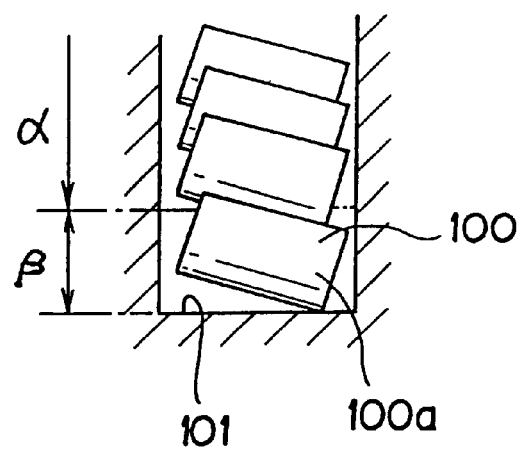

LINEAR ROLLER GUIDE DEVICE

This application is a division of prior application Ser. No. 09/029,322 filed Nov. 25, 1998, U.S. Pat. No. 6,217,217 which is a §372 U.S. stage of application PCT/JP97/01606, filed May 13, 1997.

TECHNICAL FIELD

The present invention relates to a linear motion guide device, and more particularly, to a linear roller guide device using rollers as rolling elements.

BACKGROUND ART

The conventional linear roller guide device of this type generally has a structure in which a movable block is movably supported on a track rail through a number of rollers. The guide device using rollers has an advantage of high rigidity and high load bearing ability in comparison with the guide device using balls. The movable block comprises a block body and side covers to be attached to both end portions of the block body. The block body is provided with a roller rolling surface and a roller returning passage for endlessly circulating a roller row, and the side cover is provided with a direction changing passage for connecting the roller rolling surface side to the roller returning passage.

Both sides of the roller rolling surface of the movable member are provided with a roller end surface guide wall for guiding an end surface of the roller, and each of the roller returning passage and the direction changing passage is also provided with a guide wall which is formed to be continuous to the roller end surface guide wall, whereby the end surfaces of the roller are guided in entire circulating passage so as to orderly circulate the rollers.

Conventionally, as to structural members such as the roller returning passage, the side cover and the roller end surface guide wall or the like, an attempt to reduce a manufacturing cost has been made by employing resin moldings as the structural members.

However, the above conventional linear roller guide devices entail drawbacks as described hereunder:

① The manufacturing process is complicated.

That is, each of the resin molded members is a molded member which is formed separately from the block body, so that a process of assembling the respective resin molded members is required after separately forming the respective members.

② The circulating defects of the roller at the roller rolling surface are liable to occur.

Namely, when assembled the resin molded members, irregularities are liable to occur at a connecting portion between the roller returning passage and the direction changing passage, and at a connecting portion between the roller rolling surface and the direction changing passage, so that there may be posed a problem, for example, that a smooth circulation of the rollers is obstructed and a problem of generation of an abnormal noise.

③ The circulating defects of the roller at the roller end surface are liable to occur.

In particular, in case of the roller, it is required to prevent skew of the roller (i.e. blurring of a rotational axis of the roller). In order to prevent the skew, it is required to guide the end surface of the roller not only in a range of a loaded area of the roller rolling surface but also in all around of an endlessly circulating passage ranging from the direction changing passage to the non-loaded area of the roller returning passage.

FIG. 15(a) shows a state that the roller 100 changes a rolling direction thereof form an unloaded area α to a loaded area β of the direction changing passage. At the time of direction changing of the roller 100, for example, as schematically shown in FIGS. 15(b) and 15(c), when the roller 100 moves from the loaded area α, and then enters into the loaded area β in a skewed state, one end portion of the roller 100a of the roller 100 will firstly collide against the roller rolling surface 101 in the loaded area, so that the smooth movement of the roller 100 is obstructed. In addition, an edge load may occur at the end portion 100a of the roller 100 entering into the loaded area β, so that the roller 100 per se and the roller rolling surface 101 are damaged thereby to deteriorate durability of the guide device. Further, vibration of the roller and changes in rolling resistance during the circulation of the rollers will occur thereby to obstruct the smooth circulation of the rollers.

In order to prevent such problems, hitherto, the end surface of the roller is formed so as to be guided by the roller end surface guide wall provided at both sides of the roller rolling surface and passage walls provided at the direction changing passage and the roller returning passage. However, since the guide system is formed by connecting the discontinuous roller end surface guide wall, direction changing passage and roller returning passage, a sticking of the roller is liable to occur due to non-uniformity in a width of the respective passages and the irregularities of the connected portions thereby to also obstruct the smooth circulation of the rollers.

④ A falling-out of the roller is required to be prevented.

On the other hand, hitherto, in order to prevent the roller from failing out from the movable block when the movable block is detached from the track rail, there is a well known structure in which a chamfered portion is provided at end portion of the roller and an engaging projection with which the chamfered portion is engaged is provided at the roller end surface guide wall formed along the roller rolling surface.

However, in case of such roller retaining system, when the engaging projection interferes with the roller during the circulation of the roller, the smooth circulation of the roller is obstructed. Therefore, when assembling the guide device, it is required to provide a small gap or clearance between the roller and the engaging projection so as not to interfere the engaging projection with the roller. However, it was difficult to provide the engaging projection to an accurate position.

In addition, the chamfered portion is required to be provided, so that an effective length for bearing the load is disadvantageously shortened in a length corresponding to the length of the chamfered portion, thereby to lower the load bearing ability.

On the other hand, there is also another well-known roller retaining system in which a number of rollers are retained in form of a chain by linking the rollers in a roller chain. However, in the case of such rollers retained in the roller chain, a problem of a running-out of the roller chain will arise during the circulation of the rollers. Therefore, it is necessary to guide the roller chain along the predetermined track. However, it was difficult to accurately guide the roller chain.

The first invention has been achieved for solving the problems described above, and an object of this invention is to provide a linear roller guide device enabling to reduce the assembling processes, to accurately position the structural members to a predetermined positions of the block body, and to secure the smooth circulation of the rollers by integrally forming at least one of the roller returning passage, roller end surface guide wall and direction changing passage with the block body.

An object of the second invention is, in addition to the object described above, to provide a linear roller guide device enabling to securely prevent the roller chain from running-out during the circulation of the rollers linked by the roller chain.

DISCLOSURE OF THE INVENTION

In order to achieve the afore-mentioned object, the first invention provides a linear roller guide device comprising a track rail and a movable block assembled to the track rail through a number of rollers, the movable block comprising:
- a roller rolling surface on which the rollers roll;
- a block body having a roller returning passage corresponding to the roller rolling surface;
- a direction changing passage inner periphery portion formed to both end surfaces of the block body;
- a pair of roller end surface guide walls formed to both sides of the roller rolling surface of the block body and adapted to guide both the end surfaces of the roller; and
- side covers each having a direction changing passage outer periphery portion for forming a direction changing passage by fitting the side cover into the direction changing passage inner periphery portion formed to both end surfaces of the block body, the track rail including a roller rolling surface extending in an axial direction corresponding to the roller rolling surface of the block body, and the rollers circulating in an endless circulating passage constituted by a loaded area between the roller rolling surface of the block body and the roller rolling surface corresponding to the track rail, the direction changing passage and the roller returning passage, wherein at least one of a roller returning passage forming member for forming the roller returning passage, a roller end surface guide wall forming member for forming at least one of the paired roller end surface guide wall and a direction changing passage inner periphery portion forming member for forming the direction changing passage inner periphery portion is formed as a molded body integrally formed with the block body by inserting the block body into a molding die.

According to the structure described above, the assembling of the roller end surface guide wall forming member, the roller returning passage forming member and the direction changing passage inner periphery portion forming member is not required, thus eliminating the assembling process for the members.

In addition, the roller end surface guide wall, the roller returning passage and the direction changing passage inner periphery portion can be formed at accurate positions with respect to the block body.

After the rollers are rolled from a starting end to a terminal end of the roller rolling surface of the block body, the rollers are rolled and moved to the roller returning passage through the direction changing passage, moved along the roller returning passage, and thereafter, supplied to the starting end side of the roller rolling surface through the direction changing passage formed at the other side of the roller rolling surface.

When the direction changing passage inner periphery portion forming member is integrally formed with the block body, it becomes possible to eliminate the irregularities to be formed at the connected portion between the roller rolling surface and the direction changing passage inner periphery portion. In addition, as to the roller returning passage forming member, when it is integrally formed with the block body, it also becomes possible to eliminate the irregularities to be formed at the connected portion between the direction changing passage inner periphery portion and the roller returning passage.

Further, in one aspect of this invention, the device may have a structure in which the roller returning passage and the direction changing passage inner peripheral portion are provided with guide walls for guiding the end surface of the roller, the guide wall being continuous to the roller end surface guide wall, and the roller returning passage, the roller end surface guide wall of at least one of the paired roller end surface guide walls and the direction changing passage inner peripheral portion are integrally formed with the block body.

According to the structure described above, the roller end surface guide walls of the roller returning passage and the direction changing passage in an unloaded area and the roller end surface guide wall to be formed along the roller rolling surface in loaded area can be continuously molded, so that the irregularities are not formed at the connected portions in all around the endless circulating passage, thus enables the end surface of the roller to smoothly move.

In addition, the gap or clearance between the guide wall and the roller end surface can be formed with high accuracy in all around the endless circulating passage, so that the generation of the skew of the roller can be securely prevented.

In another aspect of this invention, the device may have a structure in which a chamfered portion is provided at least one end portion of the roller and an engaging projection with which the chamfered portion of the roller is engaged is provided at the roller end surface guide wall integrally molded with the block body so as to prevent the roller from falling out.

As described above, when such engaging projection is provided at the roller end surface guide wall to be integrally molded with the block body, the engaging projection can be accurately positioned with respect to the block body, so that the falling-out of the roller can be securely prevented even if the bearing block is detached from the track rail. In addition, there is not the slightest fear of interference of the block body with the roller during the circulation of the roller.

The guide device has a structure having four rows of rollers in total in which a pair of right and left rows of rollers are disposed to be rollable between the upper surface of the track rail and a lower surface of a horizontal portion of the block body and other two rows of the rollers each is disposed between the right and left side surfaces of the track rail and an inside surfaces of a suspending portion of the block body, respectively.

In this case, it is preferable that a contact angle line constituted by a line connecting two contact points of the roller disposed between the corresponding roller rolling surfaces formed to the upper surface of the track rail and the horizontal portion of the block body is set to vertically extend with an inclination angle of about 90° with respect to a horizontal line, while a contact angle line of the roller disposed between the corresponding roller rolling surfaces formed to the right and left side surfaces of the track rail and the inside surfaces of the suspending portion of the block body is set to obliquely extend downwards and is formed so as to incline with an inclination angle of 30° with respect to a horizontal line.

In still another aspect of this invention, the guide device has a structure having four rows of rollers in total in which two rows of rollers are vertically disposed to be rollable between a right side surface of the track rail and a right inside surface of the suspending portion of the block body, and vertically disposed to be rollable between a left side surface of the track rail and a left inside surface of the suspending portion of the block body, respectively.

Among the two rows of the rollers arranged vertically at upper and lower portions, it is preferable that the upper row of rollers is formed so that a contact angle line of the roller is set to obliquely extend upwards from a side of the track rail to sides of the right and left suspending portions of the block body, and is formed so as to incline with an inclination angle of almost 45° with respect to a horizontal line, while the lower row of rollers is formed so that a contact angle line of the roller is set to obliquely extend downwards, and is formed so as to incline with an inclination angle of almost 45°, or that the upper row of rollers is formed so that a contact angle line of the roller is set to obliquely extend downwards from a side of the track rail to sides of the right and left suspending portions of the block body, and is formed so as to incline with an inclination angle of almost 45° with respect to a horizontal line, while the lower row of rollers is formed so that a contact angle line of the roller is set to obliquely extend downwards, and is formed so as to incline with an inclination angle of almost 45°.

In particular, at a time of an insert molding, when a block supporting portion corresponding to the roller rolling surface of the block body is provided to an inner periphery of a molding die and the roller rolling surface is contacted to the block supporting portion, the block body can be effectively positioned in the molding die.

According to such structure, a pair of right and left roller rolling grooves (surfaces) of the block body will contact to the block supporting portion. As a result, the block body is supported by the paired right and left block supporting portions so that the block body is clamped from every four directions and supported by four points. Therefore, even if an injection pressure of a molding material is applied to the block body from every directions, the block body can be held unmoved, and the burr is not formed at a portion between the roller rolling surface and the block supporting portion.

In a second invention, there is provided a linear roller guide device comprising a track rail and a movable block assembled to the track rail through a number of rollers, the movable block comprising:
a block body having a roller rolling surface and a roller returning passage corresponding to the roller rolling surface;
a direction changing passage inner periphery portion formed to both end surfaces of the block body; and
side covers each having a direction changing passage outer periphery portion for forming a direction changing passage by fitting the side cover into the direction changing passage inner periphery portion formed at both end surfaces of the block body,
the track rail including a roller rolling surface extending in an axial direction corresponding to the roller rolling surface of the block body,
the rollers circulating in an endless circulating passage constituted by a loaded area between the roller rolling surface of the block body and the roller rolling surface corresponding to the track rail, the direction changing passage and the roller returning passage, and the rollers are linked to each other by a roller chain inserted to be movable in the endless circulating passage, wherein the roller returning passage and the direction changing passage inner periphery guide portion are provided with a roller chain guide portion for guiding a track of the roller chain onto a predetermined track,
wherein at least one of the roller returning passage forming member for forming the roller returning passage and the direction changing passage inner periphery portion forming member for forming the direction changing passage inner periphery portion is integrally molded by inserting the block body into a molding die.

According to the structure described above, the rollers can be smoothly rolled and moved in the endless circulating passage while being kept in a state where center axes of the respective rollers are retained in parallel to each other and intervals of adjacent rollers are retained in a predetermined distance, thus enabling to prevent the skew-generation.

In addition, the roller chain is guided onto the predetermined track by the roller chain guide portions formed to the roller returning passage and the direction changing passage, and the rollers shall be accurately guided by the roller chain guided by the roller chain guide portion. Further, a run-out of the roller chain can be prevented by the roller chain guide portion.

In addition, when the roller returning passage forming member for forming the roller returning passage and the direction changing passage inner periphery portion forming member for forming the direction changing passage inner periphery portion to which the roller chain guide portions are formed are integrally molded with the block body, the roller chain guide portions can be formed on accurate positions of the track.

In addition, when the direction changing passage inner periphery portion forming member is integrally formed with the block body, it becomes possible to eliminate the irregularities to be formed at the connected portion between the roller rolling surface and the direction changing passage inner periphery portion. Further, as to the roller returning passage, when it is integrally formed with the block body, it also becomes possible to eliminate the irregularities to be formed at the connected portion between the direction changing passage inner periphery portion and the roller returning passage. As a result, the rollers can be further smoothly circulated and moved in cooperation with the guiding function of the roller chain.

Furthermore, when the roller chain is formed so as to have an endless structure and is provided with a falling-out preventing portion for the rollers, the falling-out of the rollers can be prevented by the roller chain even if the movable block is detached from the track rail.

Further, the roller chain is preferably provided with a guide projecting portion so as to project from the end surface of the roller in an axial direction of the roller, while the roller returning passage and the direction changing passage inner peripheral portion are preferably provided with guide grooves with which the guide projecting portion is engaged. In addition, at least one side of the roller rolling surfaces formed to the block body is preferably provided with a guide wall having the guide groove extending in parallel to the roller rolling surface for guiding the guide projecting portion in parallel to the roller rolling surface. As to this guide wall, it is also preferable to integrally mold the guide wall with the block body by using an insert molding method and to continuously form the guide groove to the roller returning passage, the direction changing passage inner periphery portion and the guide wall so that the guide groove ranges to all around the endless circulating passage.

According to the structure described above, when the roller chain is circulated and moved, the guide projecting portion is engaged with the guide groove formed to the roller returning passage and the direction changing passage inner peripheral portion, so that the run-out of the roller chain is suppressed. As a result, the rollers can be rolled and moved in orderly arranged state in all around the endless circulating passage.

In addition, in a case where the roller chain is formed in a striped-shape having no connected portion at both ends thereof, when the movable block is detached from the track rail, the guide projecting portion is engaged with the guide groove, thus enabling to prevent a sagging or slack of an end portion of the roller chain. Further, also in a case of the roller chain having an endless structure, the sagging or slack of an intermediate portion of the roller chain can be prevented.

In still another aspect of this invention, the roller chain comprises spacer portions disposed between the adjacent rollers and connecting portions for connecting the respective spacer portions, and the guide projecting portion is provided to the connecting portion.

Accordingly, each of the rollers is arranged and circulated in a state where the rollers are retained by the spacer portions form back and forth in the arranging direction thereof.

Further, when a falling-out preventing portion for the roller is provided to the spacer portion so as to prevent the falling-out of the roller from back and forth of the roller, it becomes unnecessary to chamfer the end portion of the roller, so that an effective length of the roller for bearing the load can be increased.

Furthermore, since only the spacer portion is disposed between the adjacent rollers, a pitch of the rollers can be formed as small as possible, so that a number of the rollers to be disposed per unit length for bearing the load can be increased as many as possible, thus improving the load bearing ability of the roller.

In still another aspect of this invention, the connecting member and the spacer portion disposed between the adjacent rollers are formed as resin moldings, the roller is formed to have a hollow portion, and the roller is retained by inserting a resin portion into the hollow portion of the roller.

According to the structure described above, the falling-out of the roller can be surely prevented and a degree of parallelization between the adjacent rollers can be accurately maintained.

In addition, the roller may be retained in such a manner that a recessed portion is formed to both end portions of the roller and the resin portion is inserted into the recessed portion or in a manner that a grooved portion is formed to a center peripheral portion of the roller and the resin portion is fitted into the grooved portion.

When the roller chain moves at portion between the roller rolling surfaces and the unloaded roller rolling passage, the roller chain takes a linear shape. In contrast, when the roller chain moves in the direction changing passage, the roller chain is deformed from linear-shape to a curved-shape. As a result, the roller chain is repeatedly deformed in accordance with the movement of the movable block.

In view of this point, it is preferable to reinforce the roller chain by inserting a wire or thin plate into the connecting member.

In the guide device of the present invention, the number of rollers and arrangement thereof are optional. However, the following arrangements are more effective.

That is, the guide device may have a structure having four rows of rollers in total in which a pair of right and left rows of rollers are disposed to be rollable between the upper surface of the track rail and a lower surface of a horizontal portion of the block body, and one row of the roller is disposed between the right and left side surfaces of the track rail and inside surfaces of a suspending portion of the block body, respectively.

In this case, it is preferable that a contact angle line constituted by a line connecting two contact points of the roller disposed between the corresponding to the roller rolling surfaces formed to the upper surface of the track rail and the horizontal portion of the block body is set to vertically extend with an inclination angle of about 90° with respect to a horizontal line, while a contact angle line of the roller disposed between the corresponding roller rolling surfaces formed to the right and left side surfaces of the track rail and the inside surfaces of the suspending portion of the block body is set to obliquely extend downwards and is formed so as to incline with an inclination angle of 30° with respect to a horizontal line.

In addition, the guide device may have a structure having four rows of rollers in total in which two rows of rollers are vertically disposed at upper and lower portions to be rollable between a right side surface of the track rail and a right inside surface of the suspending portion of the block body, and vertically disposed to be rollable between a left side surface of the track rail and a left inside surface of the suspending portion of the block body, respectively.

Among the two rows of the rollers arranged vertically, it is preferable that the upper row of rollers is formed so that a contact angle line of the roller is set to obliquely extend upwards from a side of the track rail to sides of the right and left suspending portions of the block body and is formed so as to incline with an inclination angle of almost 45° with respect to a horizontal line, while the lower row of rollers is formed so that a contact angle line of the roller is set to obliquely extend downwards, and is formed so as to incline with an inclination angle of almost 45°; or that the upper row of rollers is formed so that a contact angle line of the roller is set to obliquely extend downwards from a side of the track rail to sides of the right and left suspending portions of the block body and is formed so as to incline with an inclination angle of almost 45° with respect to a horizontal line, while the lower row of rollers is formed so that a contact angle line of the roller is set to obliquely extend downwards and is formed so as to incline with an inclination angle of almost 45°.

In particular, at a time of an insert molding, when a block supporting portion corresponding to the roller rolling surface of the block body is provided to an inner periphery of a molding die and the roller rolling surface is contacted to the block supporting portion, the block body can be effectively positioned in the molding die.

According to such structure, a pair of right and left roller rolling grooves (surfaces) of the block body will contact to the block supporting portion. As a result, the block body is supported by the paired right and left block supporting portions so that the block body is clamped from every four directions and supported by four points. Therefore, even if an injection pressure of a molding material is applied to the block body from every directions, the block body can be held unmoved, and the burr is not formed at a portion between the roller rolling surface and the block supporting portion.

BRIEF DESCRIPTION OF THE DRAWINGS

FIG. 2 is also a view showing one embodiment of the first invention.

FIG. 7 is a view showing still another roller contact angle structures of the embodiment according to the first invention in which FIG. 7(a) is a cross sectional view of the linear roller guide device and FIG. 7(b) is a cross sectional view showing a direction changing passage.

FIG. 8 is a view showing one embodiment of a linear roller guide device according to the second invention in which a roller chain is used.

FIG. 9 is a view showing structures of chain guide portions and roller chains in FIG. 8.

FIG. 10 is a view showing another embodiment of the roller chain shown in FIG. 9.

FIG. 14 is a view showing another roller contact angle structure of the embodiment according to the second invention.

FIG. 15 is an explanatory view showing a state where a roller-skew occurs in a conventional linear roller guide device.

BEST MODE FOR EMBODYING THE INVENTION

[The First Invention]

Hereunder, the first invention will be explained with reference to the accompanying drawings.

Figure 1:
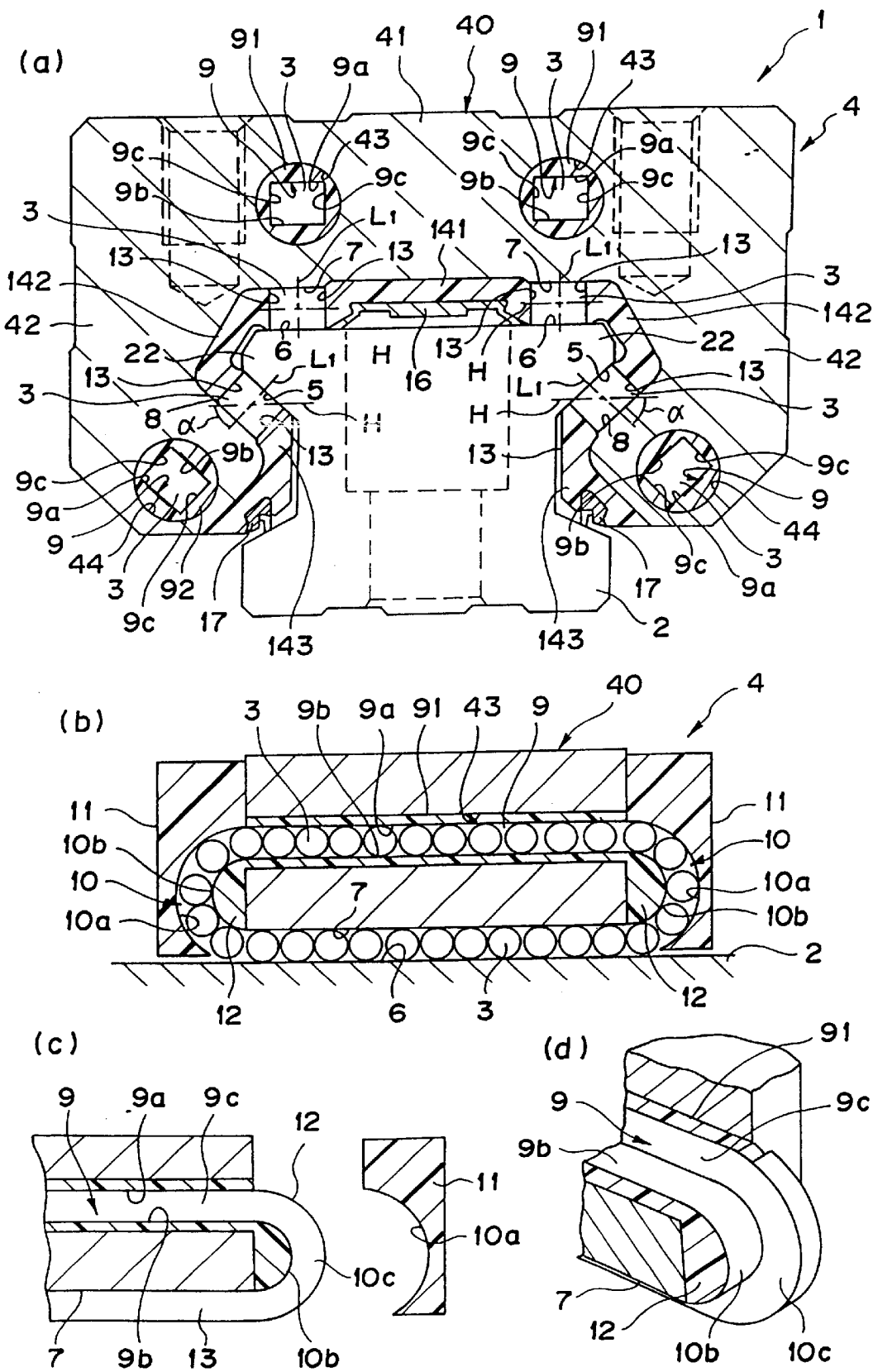
FIG. 1 is a view showing one embodiment of a linear roller guide device according to the first invention.

FIGS. 1 and 2 are views showing an embodiment of a linear roller guide device according to the first invention. The linear roller guide device 1 comprises a track rail 2, four rows of rollers 3 in total of which two rows of rollers are disposed to an upper side surface of the track rail 2 and one row of rollers is disposed to both right and left side surfaces of the track rail 2 respectively, and a movable block 4 assembled to be movable through the four rows of rollers 3.

The track rail 2 is an elongated member formed to have a rectangular shape in section, an upper portion of both the side surfaces of the track rail being formed to have tapered surfaces which gradually expand outwardly in upward direction, and each of the right and left tapered surfaces is provided with one row of roller rolling surface 5, respectively. In addition, the upper surface of the track rail 2 is formed to be a plain surface of which both right and left end portions are provided with one row of roller rolling surface 6, respectively, i.e., two rows of the roller rolling surfaces 6 in total.

The movable block 4 comprises a block body 40 formed of metal, and side covers 11 to be attached to both end surfaces of the block body 40.

The block body 40 has a U-shaped cross section and high rigidity, and comprises a horizontal portion 41 opposing to the upper surface of the track rail 2, a pair of suspending portions 42 and 42 suspending from the right and left end portions of the horizontal portion 41 so as to clamp both the right and left side surfaces of the track rail 2. A lower surface of the horizontal portion 41 is provided with a pair of roller rolling surfaces 7, 7 corresponding to the paired roller rolling surfaces 6, 6 formed to the upper surface of the track rail 2, while each of inner side surfaces of the right and left suspending portions 42, 42 is provided with a roller rolling surface 8 corresponding to the respective roller rolling surfaces 5, 5 formed to the right and left side surfaces of the track rail 2.

Figure 3:
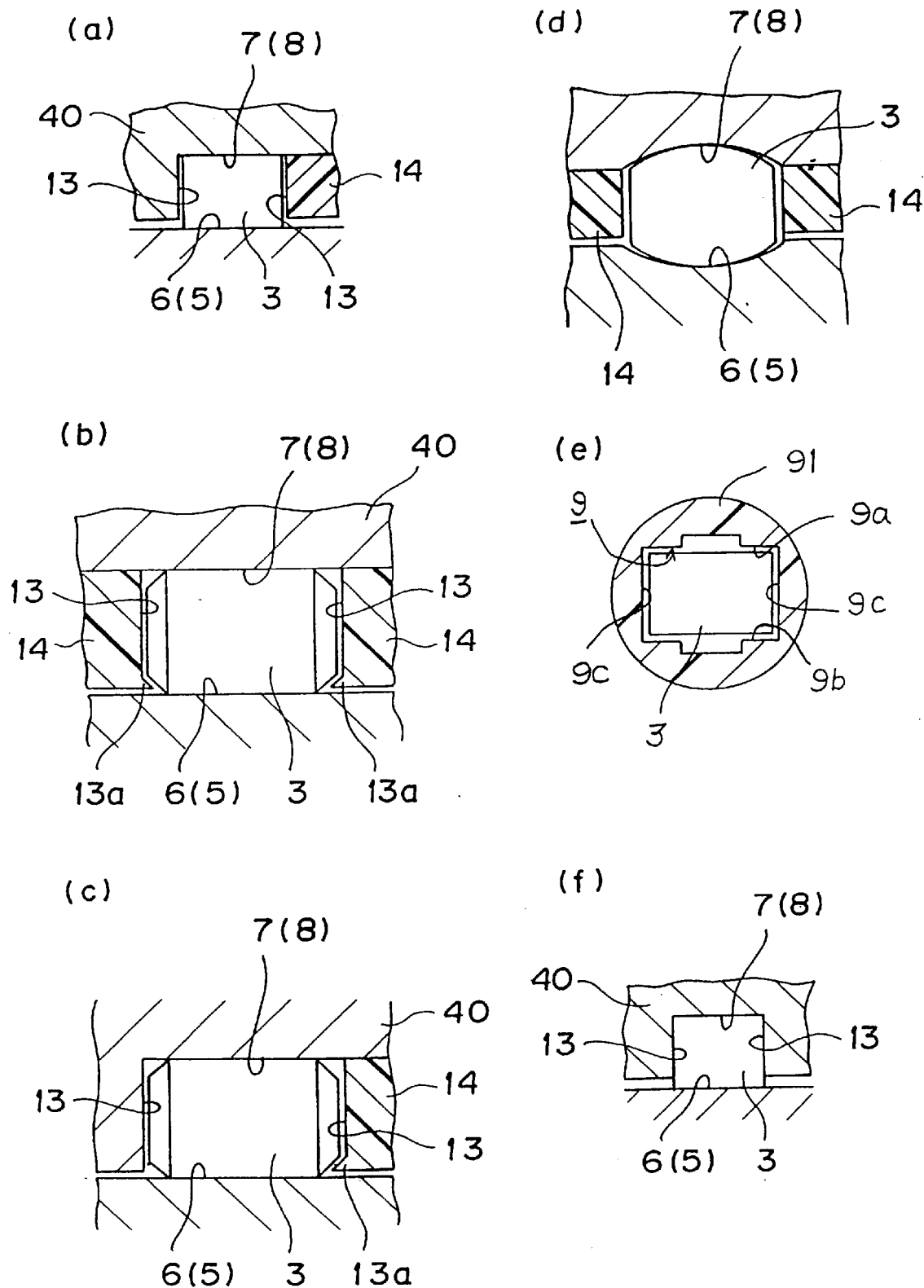
FIG. 3 is a view showing various modifications of the roller end surface guide walls and roller retaining structures for the linear roller guide device shown in FIG. 1.

A number of rollers 3 are disposed between four pairs of roller rolling surfaces 5, 8; 6, 7, corresponding to each other, that are formed to opposing surfaces between the track rail 2 and the movable block 4, whereby roller rows for bearing a load to be applied to portions between the track rail 2 and the movable block 4 are assembled. A predetermined preload is applied to respective rollers 3. The roller 3 is formed as a cylindrical roller. However, as shown in FIG. 3(d), a barrel-shaped roller having a circular-arc shaped cross section in axial direction can be also available as the roller 3.

Each of the rollers 3 linearly contacts to the roller rolling surfaces 5, 8; 6, 7. A contact angle line L1 constituted by a line connecting two contact portions of the roller disposed between the corresponding to the roller rolling surfaces 5, 8; 6, 7 formed to the upper surface of the track rail 2 and the horizontal portion 41 of the block body 40 is set to vertically extend with an inclination angle of about 90° with respect to a horizontal line passing through a center of the roller 3, while a contact angle line of the roller 3 disposed between the corresponding to the roller rolling surfaces formed to the right and left side surfaces of the track rail 2 and the inside surfaces of the right and left suspending portions 42, 42 of the block body 40 is set to obliquely extend toward a center of the track rail 2 and is formed so as to upwardly incline with a predetermined angle of α with respect to a horizontal line H passing through a center of the roller 3, thereby to form a structure in which both the right and left corner portions 22, 22 of an upper portion of the track rail 2 are clamped by the two rows of rollers 3, 3 disposed to the right and left sides of the track rail 2 and by the two rows of rollers 3, 3 disposed to the upper surface side of the track rail 2. In the embodiment shown in Figure, the angle of α is set to about 30°.

The block body 40 is provided with four rows of the roller returning passages 9 for circulating and guiding the four rows of rollers 3. The roller returning passage 9 linearly extend in parallel to the respective roller rolling surfaces 5, 6 formed to the block body 40. Two rows of the roller returning passages 9 are provided to the horizontal portion 41, while two rows of the roller returning passages 9 are respectively provided to the right and left suspending portions of the block body 40. The roller returning passage 9 is formed from a roller returning passage forming member 91 composed of resin.

The roller returning passage forming member 91 is integrally bonded to an inner peripheral portion of a penetration bore 43 penetrating through the horizontal portion 41 and the suspending portion 42 of the block body 40. An outer peripheral shape of the roller returning passage forming member 91 is formed to have a cylindrical shape which conforms to an inner peripheral shape of the penetration bore 43. The inner periphery of the roller returning passage forming member 91 is provided with a roller returning passage 9 having a rectangular cross section for guiding the roller 3.

The roller returning passage 9 comprises a pair of unloaded roller guide surfaces 9a, 9b extending in parallel to each other for guiding a cylindrical outer periphery surface of the roller 3, and a pair of unloaded roller end surface guide surfaces 9c, 9c extending in parallel to each other for guiding end surfaces of the roller 3.

A gap or clearance between the paired unloaded roller guide surfaces 9a, 9b is set to slightly larger than a diameter of the roller 3 so as to form a small gap therebetween, while a gap or clearance between the paired unloaded roller end surface guide surfaces 9c, 9c is set to slightly larger than a length of the roller 3 so as to form a small gap therebetween, thus resulting in a structure enabling to smoothly move the rollers 3 (see FIG. 3(e)).

Figure 5:
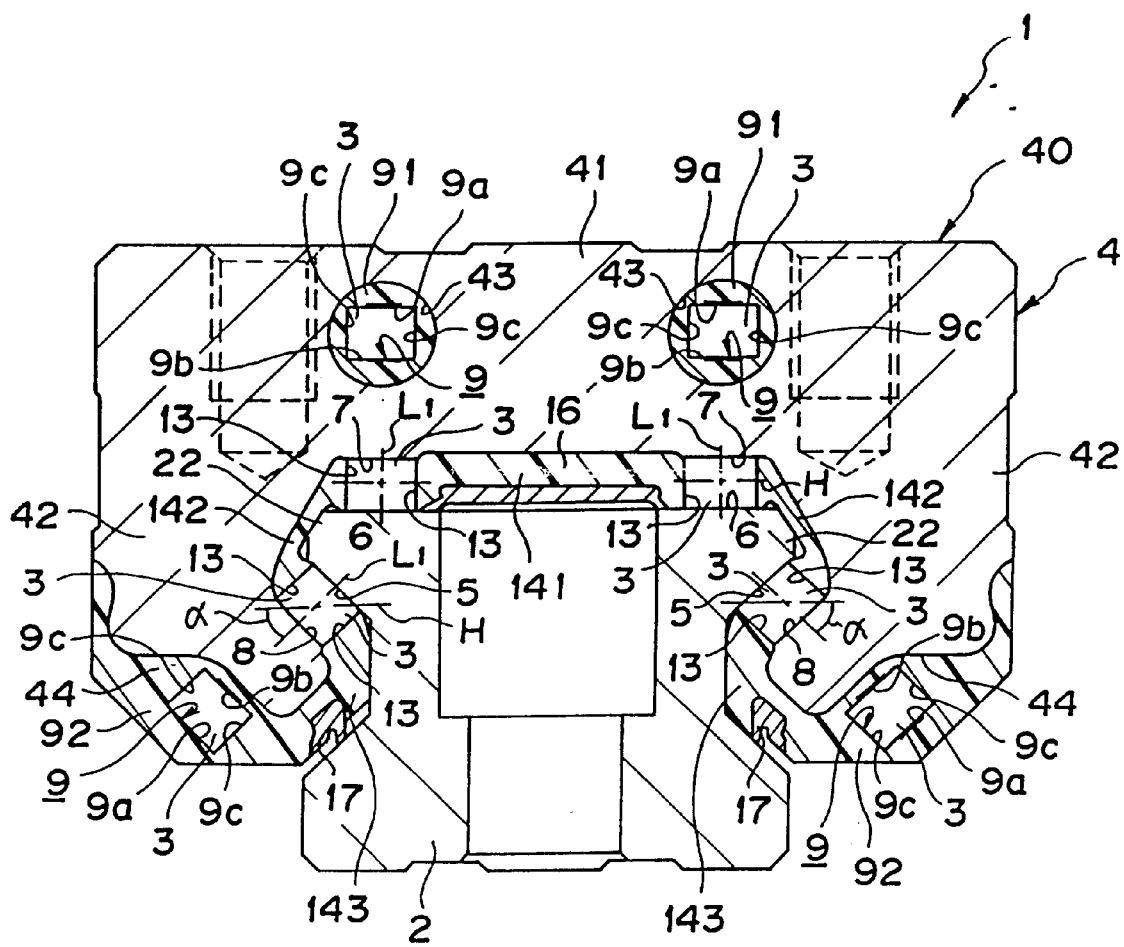
FIG. 5 is a view showing a modification of a roller returning passage forming member shown in FIG. 1.

FIG. 5 shows another embodiment of a roller returning passage forming member 92 to be formed to the suspending portion 42 of the block body 40. Namely, the roller returning passage forming member 92 is integrally bonded to a recessed portion 44 formed to a lower end portion of the right and left suspending portions 42 of the block body 40. The roller returning passage forming member 91 is integrally connected to a third loaded roller end surface guide wall forming member 143 provided to the inner peripheral side of the suspending portion 42.

According to the structure described above, the block body 40 is required to be provided with only two penetration bores 43 to be formed to the horizontal portion 41, thus enabling to simplify the manufacturing of the device.

In addition, as shown in FIGS. 1(b), (c) and 2, both end portions of the block body 40 are provided with side covers 11 constituting a direction changing passage 10 for changing the rolling direction of the roller 3 to the roller returning passage 9, the roller 3 being disposed between the loaded roller rolling surfaces 5, 8; 6, 7 formed to the track rail 2 and the block body 40.

The direction changing passage 10 is formed to be a pipe having a U-shape. The side cover 11 is formed with only a direction changing passage inner periphery portion 10a of the direction changing passage 10, while a direction changing passage inner periphery portion forming member 12 is integrally bonded to both end portions of the block body 40.

This direction changing passage 10 has a rectangular shaped cross section, and both side portions of the direction changing passage outer periphery portion 10a and the inner periphery portion 10b for guiding the outer periphery surface of the roller 3 are provided with direction changing roller end surface guide walls 10c, 10c for guiding the end surfaces of the roller 3. This direction changing roller end surface guide walls 10c together with the direction changing passage inner periphery portion 10b are formed to the direction changing passage inner periphery portion forming member 12. Then, when the side cover 11 formed with the direction changing passage outer periphery portion 10a is fitted into the end surface of the block body 40 formed with the direction changing passage inner periphery portion 10b and the direction changing roller end surface guide walls 10c, the direction changing passage 10 having a U pipe shape is formed.

In this regard, the direction changing roller end surface guide walls 10c, 10c together with the direction changing passage outer periphery portion 10a may be provided to the side cover 11. In another way, one direction changing roller end surface guide wall 10c together with the direction changing passage inner periphery portion 10b may be provided to a side of the direction changing passage inner periphery portion forming member 12, while the other direction changing roller end surface guide walls 10c together with the direction changing passage outer periphery portion 10a may be provided to the side cover 11.

In still another way, the direction changing roller end surface guide wall 10c is divided into two portions i.e., an inner periphery side portion and an outer periphery side portion, and then, the outer periphery side portion may be formed to the side cover 11, while the inner periphery side portion may be provided to the direction changing passage inner periphery portion forming member 12.

Further, as shown in FIG. 1(a), along the respective four rows of roller rolling surfaces 7, 8 of the block body 40, there is provided with a loaded roller end surface guide wall 13 for guiding the end surfaces of the roller in the loaded area. In order to form the loaded roller end surface guide wall 13, the block body 40 comprises a first end surface guide wall forming member 141 to be integrally bonded to a lower surface of the horizontal portion 40, right and left second end surface guide wall forming members 142 to be integrally bonded to recessed corner portions between the horizontal portion 41 and the right and left suspending portions 42, and right and left third end surface guide wall forming members 143 to be integrally bonded to a lower portion of inner side surface of the right and left suspending portions 42.

The both end portions of the first end surface guide wall forming member 141 and an upper end portion of the second end surface guide wall forming members 142 are provided with loaded roller end surface guide walls 13, 13; 13, 13 for guiding the end surfaces of the roller 3 rolling on the roller rolling surfaces 7, 7 formed to the lower surface of the horizontal portion 41 of the block body 40.

In addition, the lower end portions of the right and left second end surface guide wall forming member 142 and an upper end portion of the third end surface guide wall forming members 143 are provided with loaded roller end surface guide walls 13, 13; 13, 13 for guiding the end surfaces of the roller 3 rolling on the roller rolling surfaces 8, 8 formed to the suspending portion 42 of the block body 40.

A gap or clearance between the paired loaded roller end surface guide walls 13, 13 is set to slightly larger than a length of the roller 3 so as to form a small gap between the end surface of the roller 3 and the guide wall 13.

Further, a first seal member 15 for sealing the gap formed between the horizontal portion 41 of the block body 40 and the upper surface of the track rail 2 is attached to the first end surface guide wall forming member 141, while a second seal member 16 for sealing the gap formed between the suspending portion 42 of the block body 40 and the right and left side surfaces of the track rail 2 is attached to the third end surface guide wall forming member 143.

In this embodiment, the loaded roller end surface guide walls 13 for guiding both end surfaces of the roller 3 is formed by the first to third end surface guide wall forming members 141–143 that are all composed of resin.

However, as shown in FIG. 3(a), the loaded roller end surface guide walls 13 for guiding one end surface of the roller 3 may be formed by the block body 40 per se, while the loaded roller end surface guide wall 13 for guiding the other end surface of the roller 3 may be formed by the loaded roller end surface guide wall forming member 14. In another way, as shown in FIG. 3(f), both side of the loaded roller end surface guide walls 13 can be also formed by the block body 40.

In this first embodiment, all of the roller returning passage forming member 91, the roller end surface guide wall forming members 141–143 and the direction changing passage inner periphery portion forming member 12 are formed by integrally molding with the movable block.

Accordingly, the unloaded roller guide surfaces 9a, 9b of the roller returning passage 9 and both the inner and outer periphery portions 10a, 10b of the direction changing passage can be continuously and integrally molded. Further, the direction changing passage inner periphery portion 10b and the roller rolling surfaces 7, 8 in the loaded area can be also integrally molded.

In addition, the roller end surface guide wall 9c of the roller returning passage 9, the direction changing roller end surface guide wall 10c of the direction changing passage 10 and the loaded area roller end surface guide wall 13 are continuously formed by being integrally molded, so that the roller end surface guide wall can be continuously formed in all around the endless circulating passage.

According to the linear roller guide device of this invention, the assembling of the loaded roller end surface guide wall forming member 14, the roller returning passage forming member 91 and the direction changing passage inner periphery portion forming member 12 is not required, thus enabling to omit the assembling process for the members.

In addition, the roller end surface guide wall 13, the roller returning passage 9 and the direction changing passage inner periphery portion 10b can be provided at accurate positions with respect to the block body 40.

As a result, after the rollers 3 are rolled from a starting end to a terminal end of the roller rolling surfaces 7, 8 in the loaded area of the block body 40, the rollers 3 are moved to the roller returning passage 9 through the direction changing passage 10, then moved along the roller returning passage 9, and thereafter, supplied to the starting end side of the roller rolling surfaces 7, 8 through the direction changing passage 10 formed at the other end of the roller rolling surfaces 7, 8.

When the direction changing passage inner periphery portion forming member 12 is integrally formed with the block body 40, it becomes possible to eliminate the irregularities to be formed at the connected portion between the roller rolling surfaces 7, 8 and the direction changing passage inner periphery portion 10b. In addition, as to also the roller returning passage forming member 91, when the member 91 is integrally formed with the block body 40, it also becomes possible to eliminate the irregularities to be formed at the connected portion between the direction changing passage inner periphery portion 10b and the roller returning passage 9.

Further, when the roller returning passage forming member 91 and the direction changing passage inner peripheral portion forming member 12 are provided with unloaded roller end surface guide wall 9c and the direction changing roller end surface guide wall 10c for guiding the end surface of the roller, the guide walls being continuous to the loaded roller end surface guide wall 13 and these roller end surface guide walls are integrally formed with the block body 40, the loaded roller end surface guide wall 13, the direction changing roller end surface guide wall 10c and the unloaded roller end surface guide wall 9c can be continuously molded in all around the endless circulating passage without forming the irregularities at the connected portions of the guide walls, thus enabling the end surface of the roller to smoothly move.

In addition, the gaps or clearances between the the loaded roller end surface guide wall 13, the direction changing roller end surface guide wall 10c, the unloaded roller end surface guide wall 9c and the roller end surfaces can be accurately maintained to constant values, so that the gaps or clearances can be limited to a small value, and the skew of the roller 3 can be securely prevented.

In addition, as shown in FIGS. 3(b) and 3(c), the device may have a structure in which a chamfered portion 3a is provided at least one end portion of the roller 3 while an engaging projection 13a, with which the chamfered portion 3a of the roller 3 is engaged, is provided at the loaded roller end surface guide wall 13 integrally molded with the block body 40 so as to prevent the roller 3 from falling out when the movable block 4 is detached from the track rail 2. A small gap is formed between the engaging projection 13a and the roller 3 so that the engaging projection 13a would not interfere with the roller 3 when the rollers 3 roll and move between the roller rolling surfaces 6, 7; 5, 8.

As described above, when the engaging projection 13a is provided at the roller end surface guide wall 13 to be integrally molded with the block body 40, the engaging projection 13a can be accurately positioned with respect to the block body 40, and the gap between the engaging projection 13a and the chamfered portion 3a of the roller 3 can be accurately maintained to a constant value, whereby there is no fear of interference of the engaging projection 13a with the roller during the circulation of the roller 3.

The integrally molding of the roller returning passage forming member 91, the direction changing passage inner peripheral portion forming member 12 and the loaded roller end surface guide wall 13 with the block body 40 is performed in accordance with an insert molding method comprising the steps of disposing the block body 40 into a molding die 15 on the basis of the roller rolling surfaces 7, 8 formed to the block body 40, forming cavities corresponding to the respective resin molded portions to be formed between an inner wall of the molding die 15 and the block body 40, and injecting a molding material into the respective cavities to form the resin molded portions.

Figure 4:
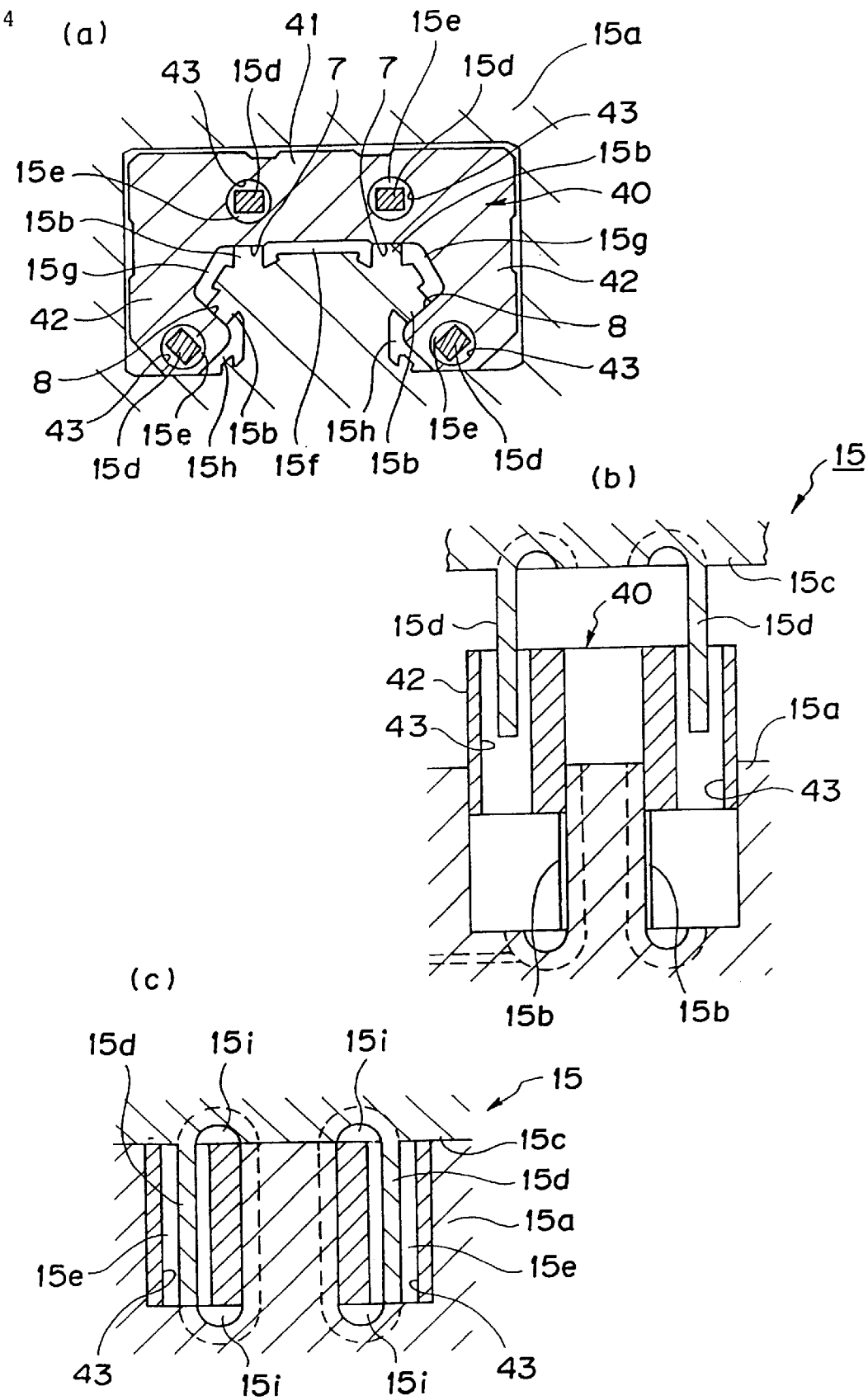
FIG. 4 is an explanatory view showing a molding method of a movable block for the linear roller guide device shown in FIG. 1.

FIG. 4 is a schematic view showing the block body 40 and states where the molding dies 15 are clamped or opened at the time of the insert molding. Namely, a fixed molding die 15a is provided with block supporting portions 15b to which the roller rolling surfaces 7, 7; 8, 8 are fitted for positioning, while a movable molding die 15c is provided with pins 15d for forming the roller returning passage.

The block supporting portions 15b have plain shapes corresponding to the roller rolling surfaces 7, 7; 8, 8 and linearly extend in parallel to each other. In this regard, FIGS. 4(b) and 4(c) show only a circumference of the roller returning passage 9 of a side of the suspending portion 42.

Cavities 15e for forming the roller returning passage forming member 91 are provided to inside the penetration bores 43 formed in the horizontal portion 41 and the suspending portion 42 of the block body 40, respectively. Further, cavities 15f–15h for forming the first to third loaded roller end surface guide wall forming members 141–143 are provided to inner periphery portions of the horizontal portion 41 and the suspending portion 42, respectively. Furthermore, cavities 15i for forming the direction changing passage inner periphery portion forming members 12 are provided to both front and back end portions of the block body 40, respectively.

In this embodiment, the paired right and left roller rolling surfaces 7, 7; 8, 8 of the block body 40 are supported at four points by the block supporting portions 15b of the molding die 15. As a result, the block body 40 can be supported unmoved by the block supporting portions 15b, even if an injection pressure of a molding material is applied to the block body 40 from every directions, whereby the roller returning passage 9, the direction changing inner periphery portion 10b and the first to third loaded roller end surface guide walls 131–133 can be accurately formed at predetermined positions.

In addition, since the block body 40 is stably positioned in the molding die 15, the burr is not formed at portions between the roller rolling surfaces 7, 7; 8, 8.

It is preferable that the block supporting portions 15b closely contact to the roller rolling surfaces 7, 8. However, even the block supporting portions 15b and the roller rolling surfaces 7, 8 are moved in a small distance due to a small gap formed therebetween, the small gap can be allowed as far as a dimension accuracy is within an allowable range and the resin material would not penetrate through the gap.

[Modifications of Roller Contact Angles]

Though the explanation described above has been made by taking an example of a case in which total four rows of rollers are disposed between corresponding portions i.e., the right and left two rows of rollers being disposed between the upper surface of the track rail 2 and the lower surface of the horizontal portion 41 of the block body 40 while one row of rollers being disposed between the right and left side surfaces of the track rail 2 and the inner side surfaces of the right and left suspending portions 42 respectively, a number and an arrangement of the roller rows are optional.

Figure 6:
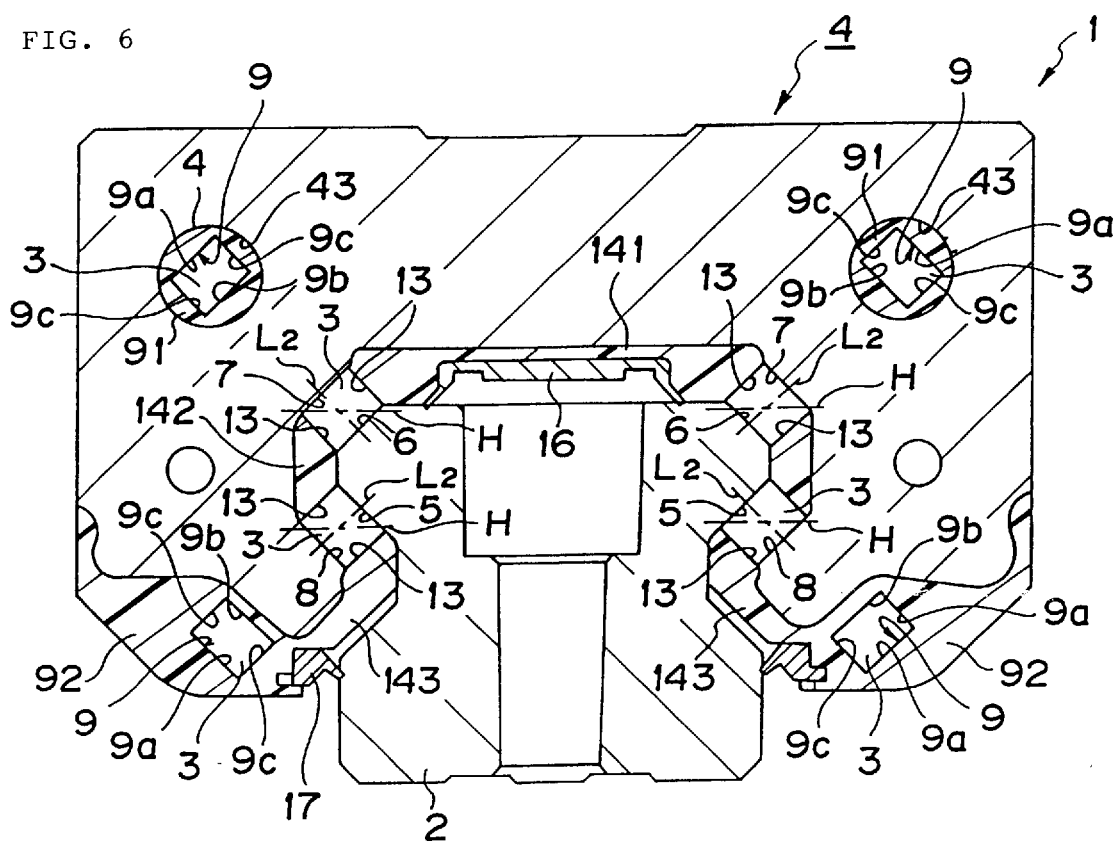
FIG. 6 is a view showing another roller contact angle structure of the embodiment according to the first invention.

For example, as shown in FIGS. 6 and 7, the device may have a structure having four rows of rollers in total of which right and left two rows of rollers are disposed between the right and left side surfaces of the track rail 2 and the inner side surfaces of the right and left suspending portions 42 of the block body 40, respectively.

FIG. 6 shows an example having a structure in which the upper row of rollers 3 among the two rows of the rollers 3 arranged vertically is formed so that a contact angle line L1 of the roller 3 is set to obliquely extend upwards from a side of the track rail 2 to the right and left suspending portions 42 of the block body 40 and is formed so as to incline with an inclination angle of almost 45° with respect to a horizontal line H, while the lower row of rollers 3 is formed so that a contact angle line L2 of the roller 3 is set to obliquely extend downwards, and is formed so as to incline with an inclination angle of almost 45°.

FIG. 7 shows an example having a structure in which the upper row of rollers 3 among the two rows of the rollers 3 arranged vertically is formed so that a contact angle line L1 of the roller 3 is set to obliquely extend downwards from a side of the track rail to sides of the right and left suspending portions 42, 42 of the block body 40 and is formed so as to incline with an inclination angle of almost 45° with respect to a horizontal line, while the lower row of rollers 3 is formed so that a contact angle line L2 of the roller 3 is set to obliquely extend upwards, and is formed so as to incline with an inclination angle of almost 45°.

In the case of this embodiment, the direction changing passages 10A, 10B of vertically arranged two rows of rollers 3 disposed to both end portions of the block body 40 are arranged alternately with a predetermined interval in an axial direction so as to intersect to each other. In this case, the direction changing passage inner peripheral portion forming member 12 formed to the end surface of the block body 40 is provided with the direction changing passage inner periphery portion 10b of the direction changing passage 10A of a side close to the block body 40 and the direction changing roller end surface guide wall 10c, the inner periphery portion 10b and the guide wall 10c being integrally molded with the block body 40.

As to the direction changing passage 10B far from the block body 40, at least one portion of the loaded roller rolling surfaces 7, 8 of an end surface side of the block body 40, the direction changing passage inner periphery portion 10b of a part which is connected to an end portion of the roller returning passage 9 and the direction changing roller end surface guide wall 10c are integrally molded with the block body 40. While, a round piece 10C formed with the direction changing passage inner periphery portion 10b is attached to a part far from the direction changing passage 10A. An inner periphery of this round piece 10C is formed with a part of an outer periphery guide portion of the inside direction changing passage 10A. The side cover 11 is formed with the direction changing passage outer peripheral portions 10a, 10a for both the direction changing passages 10A, 10B arranged vertically.

According to the first invention described above, the assembling of the roller end surface guide wall, the roller returning passage and the direction changing passage inner periphery portion is not required, thus eliminating the assembling process for the members.

In addition, the roller end surface guide wall, the roller returning passage and the direction changing passage inner periphery portion can be formed at accurate positions with respect to the block body.

When the direction changing passage inner periphery portion is integrally formed with the block body, it becomes possible to eliminate the irregularities to be formed at the connected portion between the roller rolling surface and the direction changing passage inner periphery portion. In addition, as to the roller returning passage, when it is integrally formed with the block body, it also becomes possible to eliminate the irregularities to be formed at the connected portion between the direction changing passage inner periphery portion and the roller returning passage.

Further, when the roller returning passage and the direction changing passage inner peripheral portion are provided with guide walls for guiding the end surface of the roller, the guide wall being continuous to the roller end surface guide wall, and the roller returning passage, the roller end surface guide wall of at least one the paired roller end surface guide walls and the direction changing passage inner peripheral portion are integrally formed with the block body, so that the roller returning passage, the guide walls of the direction changing passage inner periphery portions and the roller end surface guide walls can be continuously molded, whereby irregularities are not formed at the connected portions, thus enabling the end surface of the roller to smoothly move.

In addition, the guide walls for the roller end surfaces can be integrally formed in continuous in all around the endless circulating passage and a gap between the guide wall and the end surface of the roller can be formed with a high accuracy, so that the skew of the roller can be securely prevented.

In addition, when the engaging projection for preventing the roller from falling out by engaging with the chamfered portion of the roller is provided at the roller end surface guide wall to be integrally molded with the block body, the engaging projection can be accurately positioned with respect to the block body, so that the falling-out of the roller can be surely prevented even if the bearing blocks is detached from the track rail. In addition, there is no fear of interference of the block body with the roller during the circulation of the roller.

In addition, at a time of an insert molding, when a block supporting portion having a shape obtained by cutting an outer peripheral portion of the roller with a cross section passing through a center axis of the roller is provided to an inner periphery of a molding die so as to correspond to the roller rolling surface of the block body and the block body is positioned in the molding die by contacting the roller rolling surface to the block supporting portion, the burr would not occur at the roller rolling surfaces.

In particular, when the paired right and left roller rolling surfaces of the block body are supported by the block supporting portions of the molding die, the block body is clamped from every four directions and supported by the paired right and left block supporting portions at four points. Therefore, even if an injection pressure of a molding material is applied to the block body from every directions, the block body can be held unmoved, and the block body can be accurately positioned.

[Second Invention]

Next, an embodiment of a second invention will be explained hereunder with reference to the accompanying drawings.

FIGS. 8 and 9 disclose embodiments of linear roller guide devices according to the second invention, respectively.

The linear roller guide device 201 comprises a track rail 202 and a movable block 204 assembled to be movable on an upper surface of the track rail 202 through four rows of rollers 203 in total of which two rows of rollers are disposed on an upper surface side of the track rail 202 and one row of rollers is disposed on the right and left side surface sides of the track rail 202, respectively.

Each of the four rows of the rollers 203 circulates in an endless circulating passage constituted by the loaded area between the roller rolling surfaces 206, 207; 205, 208 of the block body 2040 and corresponding to the track rail 202, the direction changing passage 210 and the roller returning passage 209. In this regard, the embodiment of this second invention is different form that of the first invention in a point where the rollers 203 are linked to each other by a roller chain 218 inserted to be movable in the endless circulating passage.

The roller chain 218 is a resin molded product, as shown in FIGS. 9(c)–(e), and comprises spacer portions 218a disposed between the adjacent rollers 203 and connecting bands (plates) 218b as connecting members for connecting the respective spacer portions 218a, the connecting bands 218b being flexible and having a thin plate-shape.

Both side surfaces of the spacer portion 218 is provided with a retaining recessed portion 218c for constituting the falling-out preventing portion having a circular-arc shape corresponding to a cylindrical surface of the roller 203. The connecting plates 218b are positioned on a virtual surface connecting the center axes of the respective rollers 203.

The spacer portion 218a is a member having a rectangular parallelepiped shape and a predetermined thickness so as to be disposed between the rollers 203 and has almost the same length in axial direction as that of the roller 203 and a width shorter than a diameter of the roller 203. In addition, side surfaces in a thickness direction of the spacer portion 218a to which the roller 203 contacts are formed with retaining recessed portions 218c having a circular-arc shape corresponding to the shape of the roller 203.

Both side end portions in axial direction of the roller of the connecting band 218b of the roller chain 218 project from the end surfaces of the roller in axial direction of the roller thereby to form guide projecting portions 2181.

Each of the rollers 203 is retained from back and forth in an arranging direction by the respective spacer portions 218a of the roller chain 218, so that it becomes unnecessary to form the chamfered portion to the end portion of the roller. As a result, a load can be supported by an entire length of the roller 203, and an effective length of the roller 203 for bearing the load can be increased.

Furthermore, since only the spacer portion 218a is disposed between the adjacent rollers 203, a pitch of the rollers 203 can be formed as small as possible, so that a number of the rollers 203 to be disposed per unit length for bearing the load can be increased as many as possible, thus improving the load bearing ability of the roller 203.

FIG. 10(a) shows an example of the roller chain 218 of a case where the roller 2031 has a hollow structure having a penetration bore 2032. In the case of the roller 203 having the hollow structure, a pre-load can be easily applied in comparison with a case of a solid roller 203, thus resulting in advantage.

A shaft portion 218d to be inserted into the penetration bore 2032 is formed to the roller chain 218, whereby the roller chain 218 is integrated with the roller 203. According to the structure described above, the falling-out of the roller 203 can be securely prevented, and the degree of parallelization between the respective rollers 203 can be accurately maintained.

FIG. 10(b) shows an example of the roller chain 218 of a case where the roller 2034 has a structure having recessed portions 2033 at its both ends.

The roller chain 218 is provided with convex portions 218e to be rotatively inserted into the recessed portions 2033 formed to both the end portions of the roller 203. According to this structure, the falling-out of the roller 2034 can be surely prevented, and the degree of parallelization between the respective rollers 2034 can be accurately maintained.

FIG. 10(c) shows an example of the roller chain 218 of a case where the roller 2036 has a structure having a circular groove 2035 at a center of outer periphery of the roller 2036.

The roller 203 is retained by fitting a ring member 218f formed to the roller chain 218 into the circular groove 2035 of the roller chain 218.

On the other hand, FIG. 10(d) shows an example of the roller chain 218 of a case where the connecting plate 218b of the roller chain 218 is reinforced. Namely, the roller 218 is moved in the endless circulating passage having a track shape in accordance with the movement of the movable block 204, and the roller chain 218 is repeatedly subjected to deformations from a linear-shape to a curved-shape, so that it is required to increase a fatigue strength of the roller chain 218.

In view of this point, it is preferable to reinforce the connecting plate 218b for linking the roller 203 by inserting reinforcing members 218g such as wire, thin plate or the like into the connecting plate 218b.

The track rail 202 is an elongated member formed to have a rectangular shape in section, an upper portion of both the side surfaces of the track rail being formed to have tapered surfaces which gradually expand outwardly in upward direction, and each of the right and left tapered surfaces is provided with one row of roller rolling surface 205, respectively. In addition, the upper surface of the track rail 202 is formed to be a plain surface of which both right and left end portions are provided with one row of roller rolling surface 206, respectively, i.e., two rows of the roller rolling surfaces 206 in total.

The movable block 204 comprises a block body 2040 formed of metal, and side covers 211 to be attached to both end surfaces of the block body 2040.

The block body 2040 has a U-shaped cross section and high rigidity and comprises a horizontal portion 2041 opposing to the upper surface of the track rail 202, a pair of suspending portions 2042, 2042 suspending from the right and left end portions of the horizontal portion 2041 so as to clamp both the right and left side surfaces of the track rail 202. A lower surface of the horizontal portion 2041 is provided with a pair of roller rolling surfaces 207, 207 corresponding to the paired roller rolling surfaces 206, 206 formed to the upper surface of the track rail 202, while each of inner side surfaces of the right and left suspending portions 2042, 2042 is provided with roller rolling surface 208, 208 corresponding to the respective roller rolling surfaces 205, 205 formed to the right and left side surfaces of the track rail 202.

A number of rollers 203 are disposed between four pairs of roller rolling surfaces 205, 208; 206, 207 corresponding to each other, that are formed to opposing surfaces between the track rail 202 and the movable block 204, whereby roller rows for bearing a load to be applied to portions between the track rail 202 and the movable block 204 are assembled. A predetermined pre-load is applied to respective rollers 203.

Each of the rollers 203 linearly contacts to the roller rolling surfaces 205, 208; 206, 207. A contact angle line L1 constituted by a line connecting two contact portions of the roller disposed between the corresponding roller rolling surfaces 205, 208; 206, 207 formed to the upper surface of the track rail 202 and the horizontal portion 2041 of the block body 2040 is set to vertically extend with an inclination angle of about 90° with respect to a horizontal line passing through a center of the roller 203, while a contact angle line of the roller 203 disposed between the corresponding to the roller rolling surfaces formed to the right and left side surfaces of the track rail 202 and the inside surfaces of the right and left suspending portions 2042, 2042 of the block body 2040 is set to obliquely extend toward a center of the track rail 202 and is formed so as to upwardly incline with a predetermined angle of α with respect to a horizontal line H passing through a center of the roller 203, thereby to form a structure in which both the right and left corner portions 2022, 2022 of an upper portion of the track rail 202 are clamped by the two rows of rollers 203, 203 disposed to the right and left sides of the track rail 202 and by the two rows of rollers 203, 203 disposed to the upper surface side of the track rail 202. In the embodiment shown in Figure, the inclination angle of α is set to about 30°.

The block body 2040 is provided with four rows of the roller returning passages 209 for circulating and guiding the four rows of rollers 203. The roller returning passage 209 linearly extend in parallel to the respective roller rolling surfaces 205, 206 formed to the block body 2040. Two rows of the roller returning passages 209 are provided to the horizontal portion 2041, while two rows of the roller returning passages 209 are respectively provided to the right and left suspending portions 2042 of the block body 2040. The roller returning passage 209 is formed of a roller returning passage forming member 2091 composed of resin.

The roller returning passage forming member 2091 is integrally bonded to an inner peripheral portion of a penetration bore 2043 penetrating through the horizontal portion 2041 and the suspending portion 2042 of the block body 2040. An outer peripheral shape of the roller returning passage forming member 2091 is formed to have a cylindrical shape which conforms to an inner peripheral shape of the penetration bore 2041. The inner periphery of the roller returning passage forming member 2091 is provided with a roller returning passage 209 having a rectangular cross section for guiding the roller 203.

The roller returning passage 209 comprises a pair of unloaded roller guide surfaces 209a, 209b extending in parallel to each other for guiding a cylindrical outer periphery surface of the roller 203, and a pair of unloaded roller end surface guide surfaces 209c, 209c extending in parallel to each other for guiding end surfaces of the roller 203.

A gap or clearance between the paired unloaded roller guide surfaces 209a, 209b is set to slightly larger than a diameter of the roller 203 so as to form a small gap therebetween, while a gap or clearance between the paired roller end surface guide walls 209c, 209c is set to slightly larger than a length of the roller 203 so as to form a small gap therebetween, thus resulting in a structure enabling to smoothly move the rollers 3.

The unloaded roller end surface guide walls 209c, 209c are formed with guide grooves 209d with which the guide projecting portions 2181 of the roller chain 218 are engaged.

Figure 11:
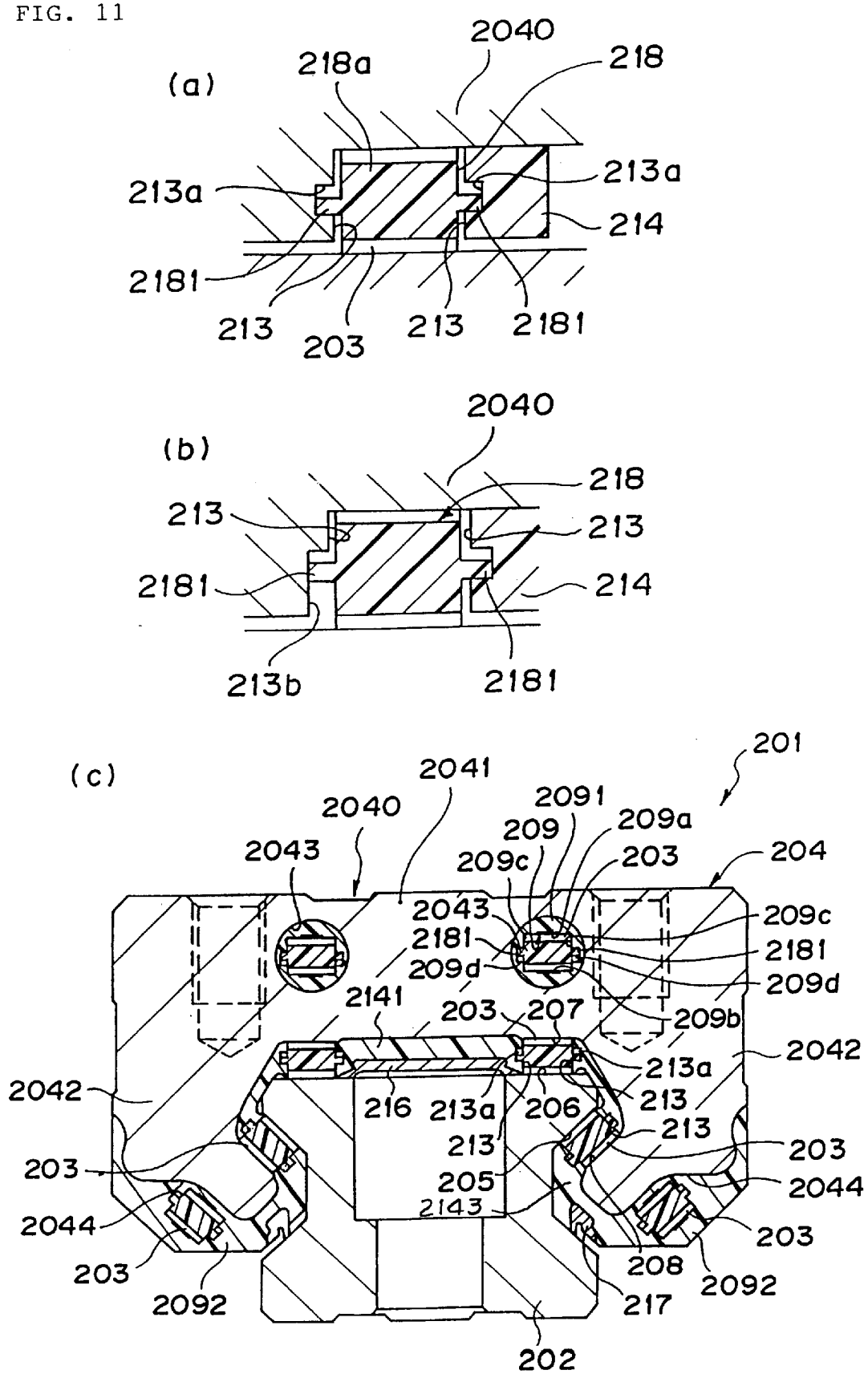
FIG. 11 is a view showing a modification of the roller end surface guide wall for the linear roller guide device shown in FIG. 8 and another structure of the roller returning passage forming member.

FIG. 11 shows another embodiment of a roller returning passage forming member 2092 to be formed to the suspending portion 2042 of the block body 2040. Namely, the roller returning passage forming member 2092 is integrally bonded to a recessed portion 2044 formed to a lower end portion of the right and left suspending portions 2042 of the block body 2040. The roller returning passage forming member 2091 is integrally connected to a third loaded roller end surface guide wall forming member 2143 provided to the inner peripheral side of the suspending portion 2042.

According to the structure described above, the block body 2040 is required to be provided with only two penetration bores 2043 to be formed to the horizontal portion 2041, thus making simple the manufacturing of the device.

In addition, as shown in FIGS. 8, 9(a) and 9(b), both end portions of the block body 2040 are provided with side covers 211 constituting a direction changing passage 210 for changing the rolling direction of the roller 203 to the roller returning passage 209, the roller 203 being disposed between the loaded roller rolling surfaces 205, 208; 206, 207 formed to the track rail 202 and the block body 2040.

The direction changing passage 210 is formed to be a pipe having a U-shape. The side cover 211 is formed with only a direction changing passage inner periphery portion 210a of the direction changing passage 210, while a direction changing passage inner periphery portion forming member 212 is integrally bonded to both end portions of the block body 2040.

This direction changing passage 210 has a rectangular shaped cross section, and both side portions of the direction changing passage outer periphery portion 210a and the inner periphery portion 210b for guiding the outer periphery surface of the roller 203 are provided with direction changing roller end surface guide walls 210c, 210c for guiding the end surfaces of the roller 203. This direction changing roller end surface guide walls 210c together with the direction changing passage inner periphery portion 210b are formed to the direction changing passage inner periphery portion forming member 212. Then, when the side cover 211 formed with the direction changing passage outer periphery portion 210a is fitted into the end surface of the block body 2040 formed with the direction changing passage inner periphery portion 210b and the direction changing roller end surface guide walls 210c, the direction changing passage 210 having a U pipe shape is formed.

The direction changing roller end surface guide walls 210c, 210c are formed with guide grooves 210d with which the guide projecting portions 2181 of the roller chain 218 are engaged.

In this regard, the direction changing roller end surface guide walls 210c, 210c together with the direction changing passage outer periphery portion 210a may be provided to the side cover 211. In another way, one direction changing roller end surface guide wall 210c together with the direction changing passage inner periphery portion 210b may be provided to a side of the direction changing passage inner periphery portion forming member 212, while the other direction changing roller end surface guide walls 210c together with the direction changing passage outer periphery portion 210a may be provided to the side cover 211.

In still another way, the direction changing roller end surface guide wall 210c is divided into two portions i.e., an inner periphery side portion and an outer periphery side portion, and then, the outer periphery side portion may be formed to the side cover 211, while the inner periphery side portion may be provided to the direction changing passage inner periphery portion forming member 212.

Further, as shown in FIG. 8(a) along the respective four rows of roller rolling surfaces 207, 208 of the block body 240, there is provided with a loaded roller end surface guide wall 213 for guiding the end surfaces of the roller in the loaded area.

The loaded roller end surface guide walls 213 are formed with guide grooves 213a with which the guide projecting portions 2181 of the roller chain 218 are engaged. In order to form the loaded roller end surface guide wall 213, the block body 240 comprises a first end surface guide wall forming member 2141 to be integrally bonded to a lower surface of the horizontal portion 2040, the right and left second end surface guide wall forming members 2142 to be integrally bonded to recessed corner portions between the horizontal portion 2041 and the right and left suspending portions 2042, and right and left third end surface guide wall forming members 2143 to be integrally bonded to a lower portion of inner side surface of the right and left suspending portions 2042.

Both the end portions of the first end surface guide wall forming member 2141 and an upper end portion of the second end surface guide wall forming members 2142 are provided with loaded roller end surface guide walls 213, 213; 213, 213 for guiding the end surfaces of the roller 203 rolling on the roller rolling surfaces 207, 207 formed to the lower surface of the horizontal portion 2041 of the block body 2040.

In addition, the lower end portions of the right and left second end surface guide wall forming members 2142 and an upper end portion of the third end surface guide wall forming members 2143 are provided with loaded roller end surface guide walls 213, 213; 213, 213 for guiding the end surfaces of the roller 203 rolling on the roller rolling surfaces 208, 208 formed to the suspending portion 2042 of the block body 2040.

A gap or clearance between the paired loaded roller end surface guide walls 213, 213 is set to slightly larger than a length of the roller 203 so as to form a small gap between the end surface of the roller 203 and the guide wall 213.

Further, a first seal member 216 for sealing the gap formed between the horizontal portion 2041 of the block body 2040 and the upper surface of the track rail 202 is attached to the first end surface guide wall forming member 2141, while a second seal member 217 for sealing the gap formed between the suspending portion 2042 of the block body 2040 and the right and left side surfaces of the track rail 202 is attached to the third end surface guide wall forming member 2143.

In this embodiment, the loaded roller end surface guide walls 213 for guiding both end surfaces of the roller 203 is formed by the first to third end surface guide wall forming members 2141–2143 that are all composed of resin.

However, as shown in FIG. 11(a), the loaded roller end surface guide walls 213 for guiding one end surface of the roller 203 may be formed by the block body 2040 per se, while the loaded roller end surface guide wall 213 for guiding the other end surface of the roller 203 may be formed by the loaded roller end surface guide wall forming member 214. In this case, the loaded roller end surface guide walls 213 may be formed with guide grooves with which the guide projecting portions 2181 of the roller chain 218 are engaged. In another way, as shown in FIG. 11(b), a cutout 213b can be also formed in place of the guide groove.

In this second embodiment, all of the roller returning passage forming member 2091, the roller end surface guide wall forming members 2141–2143 and the direction changing passage inner periphery portion forming member 212 is formed by integrally molding with the movable block 2040.

Accordingly, the unloaded roller guide surfaces 209a, 209b of the roller returning passage 209 and both the inner and outer periphery portions 210a, 210b of the direction changing passage can be continuously and integrally molded. Further, the direction changing passage inner periphery portion 210b and the roller rolling surfaces 207, 208 in the loaded area can be also integrally molded.

In addition, the roller end surface guide wall 209c of the roller returning passage 209, the direction changing roller end surface guide wall 210c of the direction changing passage 210 and the loaded area roller end surface guide wall 213 are continuously formed by being integrally molded, so that the roller end surface guide wall can be continuously formed in all around the endless circulating passage. In addition, the guide groove for engaging with the guide projecting portion 2181 of the roller chain 218 can be continuously formed in all around the endless circulating passage.

According to the linear roller guide device of this invention, the roller returning passage forming member 2091 and the direction changing passage inner periphery portion forming member 212 are not required, thus enabling to omit the assembling process for the members. In addition, the roller returning passage 209 and the direction changing passage inner periphery portion 210a can be provided at accurate positions with respect to the block body 2040.

When the direction changing passage inner periphery portion forming member 212 is integrally formed with the block body 2040, it becomes possible to eliminate the irregularities to be formed at the connected portion between the roller rolling surfaces 207, 208 and the direction changing passage inner periphery portion 210b. In addition, as to the roller returning passage 209, when the member 91 is integrally formed with the block body 2040, it becomes also possible to eliminate the irregularities to be formed at the connected portion between the direction changing passage inner periphery portion 210b and the unloaded roller guide surface 209b of the roller returning passage 209.

On the other hand, the rollers 203 can be smoothly rolled and moved from the roller returning passage 209 in the unloaded area and the direction changing passage 210 to the loaded area between the roller rolling surfaces 206, 207; 205, 208 while being held in a state where the center axes of the respective rollers 203 are retained in parallel to each other and intervals of adjacent rollers 203 are retained in a predetermined distance by the roller chain 218.

In particular, when the roller chain 218 is circulated and moved, the guide projecting portions 218a formed to the roller chain 218 are guided in all around the circulating passage by the guide grooves 209d, 210d and 213a formed to the guide walls 213 provided to both sides of the roller returning passage 209, the direction changing inner periphery portion 210b and the roller rolling surfaces 207, 208, so that the run-out of the roller chain 218 during the circulation can be suppressed in all around the circulating passage. Accordingly, the roller chain 218 can circulate and move on a predetermined track in all around the endless circulating passage. As a result, the rollers 203 can accurately roll and move, thus preventing the skew-generation of the rollers 203.

Furthermore, in this embodiment, the gaps between the guide walls 213, the direction changing roller end surface guide wall 210c in the loaded area and the unloaded roller end surface guide wall 209c and the roller end surfaces can be accurately maintained to a predetermined value, so that the gap can be reduced to a sufficiently small value. As a result, the skew of the rollers 203 can be securely prevented in cooperation with the retaining function of the roller chain 218.

Furthermore, when the movable block 204 is detached from the track rail 202, the rollers 203 are retained by the roller chain 218.

The integrally molding of the roller returning passage forming member 2091, the direction changing passage inner peripheral portion forming member 212 and the loaded roller end surface guide wall 213 with the block body 2040 is performed in accordance with an insert molding method comprising the steps of disposing the block body 2040 into a molding die 215 on the basis of the roller rolling surfaces 207, 208 formed to the block body 2040, forming cavities corresponding to the respective resin molded portions to be formed between an inner wall of the molding die 215 and the block body 2040, and injecting a molding material into the cavities to form the resin molded portions.

Figure 12:
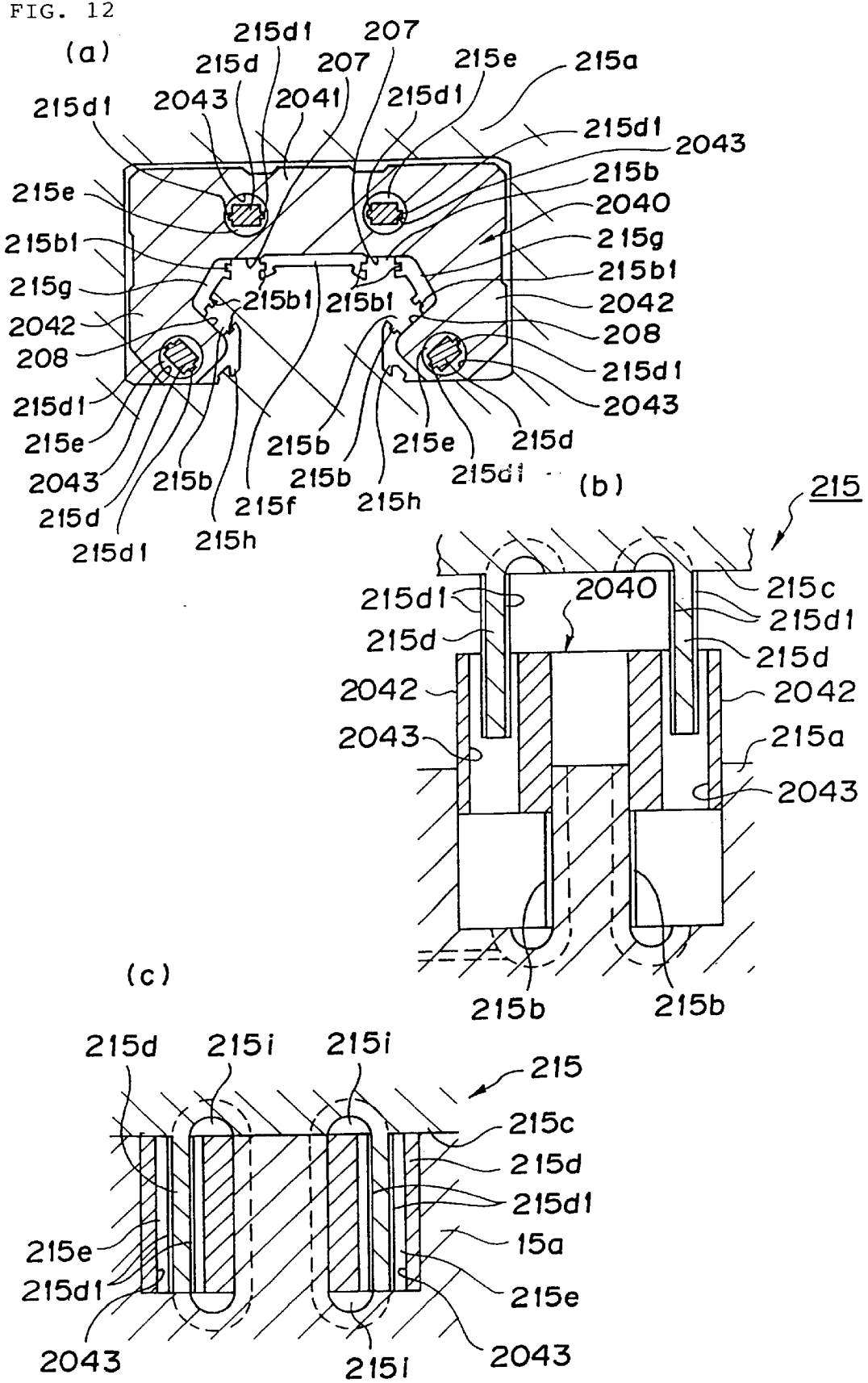
FIG. 12 is a view showing a molding method of a movable block shown in FIG. 8.

FIG. 12 is a schematic view showing the block body 2040 and states where the molding dies 215 are clamped or opened at the time of the insert molding. Namely, a fixed molding die 215a is provided with block supporting portions 215b to which the roller rolling surfaces 207, 207; 208, 208 are fitted for positioning, while a movable molding die 215c is provided with pins 215d for forming the roller returning passage. The block supporting portions 215b and the pins 215d are formed with projecting portions 215b1, 215d1 corresponding to the guide projecting portion 2181 of the roller chain 218.

The block supporting portions 215b have plain shapes corresponding to the roller rolling surfaces 207, 207; 208, 208 and linearly extend in parallel to each other. In this regard, FIGS. 12(b) and 12(c) shows only a circumference of the roller returning passage 209 of a side of the suspending portion 2042.

Cavities 215d for forming the roller returning passage forming member 2091 are provided inside the penetration bores 2043 formed in the horizontal portion 2041 and the suspending portion 2042 of the block body 2040, respectively. Further, cavities 215e for forming the first to third loaded roller end surface guide wall forming members 213 are provided to inner periphery portions of the horizontal portion 2041 and the suspending portion 2042, respectively. Furthermore, cavities 215f for forming the direction changing passage inner periphery portion forming members 212 are provided to both front and back end portions of the block body 2040, respectively.

In this embodiment, the paired right and left roller rolling surfaces 207, 207; 208, 208 of the block body 2040 are supported at four points by the block supporting portions 215b of the molding die 215. As a result, the block body 2040 can be supported unmoved by the block supporting portions 215b, even if an injection pressure of a molding material is applied to the block body 2040 from every directions, whereby the roller returning passage 209, the direction changing inner periphery portion 210b and the first to third loaded roller end surface guide walls 2131–2133 can be accurately formed at predetermined positions.

In addition, since the block body 2040 is stably positioned in the molding die 215, the burr is not formed at portions between the roller rolling surfaces 207, 207; 208, 208.

It is preferable that the block supporting portions 215b closely contact to the roller rolling surfaces 207, 208. However, even the block supporting portions 215b and the roller rolling surfaces 207, 208 are moved in a small distance due to a small gap formed therebetween, the small gap shall be allowed as far as a dimension accuracy is within an allowable range and the resin material would not penetrate through the gap.

[Modifications of Roller Contact Angles]

Though the explanation described above has been made by taking into consideration an example of a case in which total four rows of rollers are disposed between corresponding portions i.e., the right and left two rows of rollers being disposed between the upper surface of the track rail 202 and the lower surface of the horizontal portion 2041 of the block body 2040 while one row of rollers being disposed between the right and left side surfaces of the track rail 202 and the inner side surfaces of the right and left suspending portions 2042 respectively, a number and an arrangement of the roller rows are optional.

Figure 13:
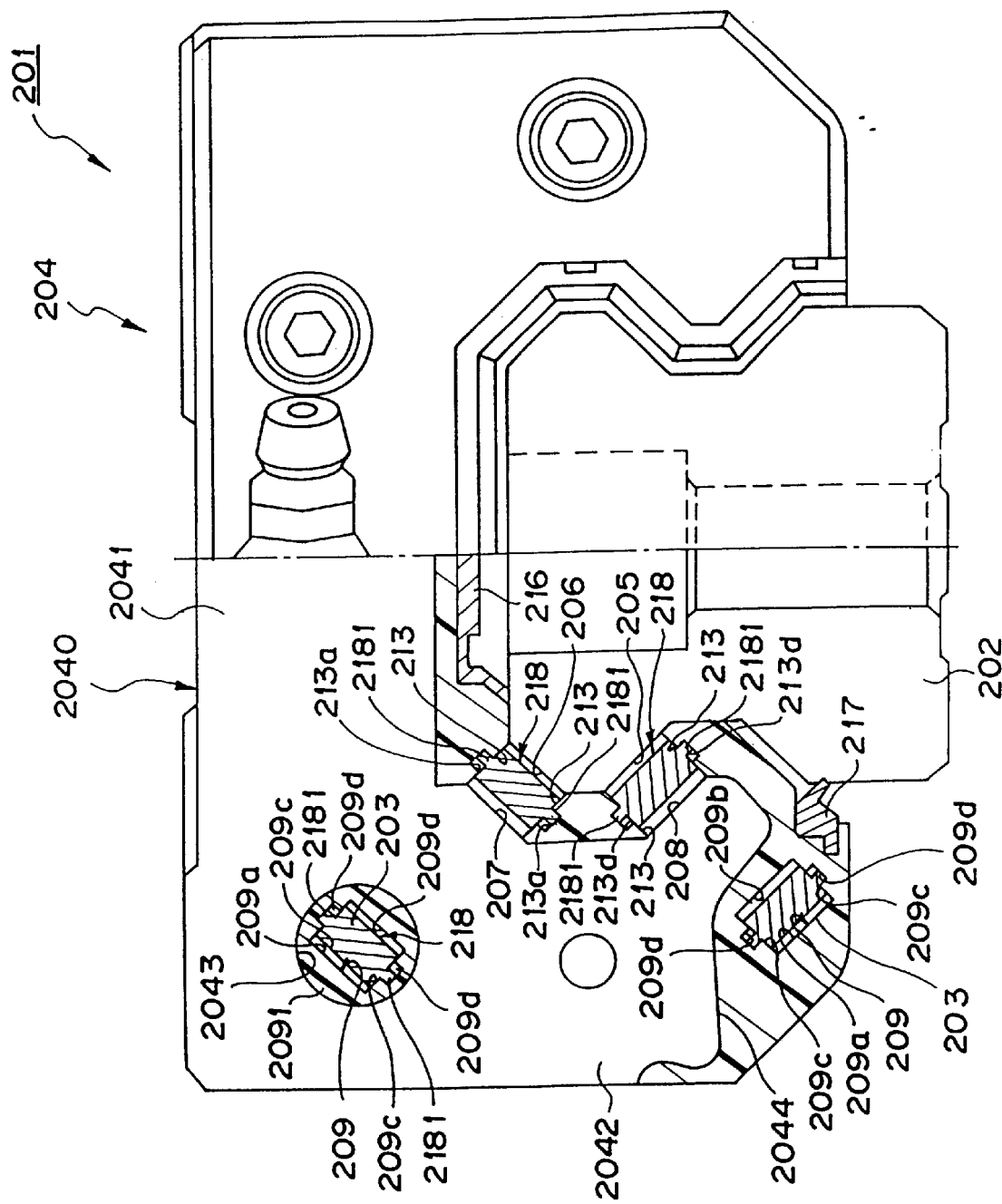
FIG. 13 is a view showing another roller contact angle structure of the embodiment according to the second invention.

For example, as shown in FIGS. 13 and 14, the device may have a structure having four rows of rollers in total in which right and left two rows of rollers are disposed between the right and left side surfaces of the track rail 202 and the inner side surfaces of the right and left suspending portions 2042 of the block body 2040, respectively.

FIG. 13 shows an example having a structure in which the upper row of rollers 203 among the two rows of the rollers 203 arranged vertically is formed so that a contact angle line of the roller 203 is set to obliquely extend upwards from a side of the track rail 202 to the right and left suspending portions 2042 of the block body 2040 and is formed so as to incline with an inclination angle of almost 45° with respect to a horizontal line, while the lower row of rollers 203 is formed so that a direction changing roller end surface guide wall 210c, the inner periphery portion 210b and the guide wall 210c being integrally molded with the block body 2040.

As to the direction changing passage 210B far from the block body 2040, at least one portion of the loaded roller rolling surfaces 207, 208 of an end surface side of the block body 2040, the direction changing passage inner periphery portion 210b of a part which is connected to an end portion of the roller returning passage 209 and the direction changing roller end surface guide wall 210c are integrally molded with the block body 2040. While, a round piece 210C formed with the direction changing passage inner periphery portion 210b is attached to a part far from the direction changing passage 210A. An inner periphery of this round piece 210C is formed with a part of an outer periphery guide portion of the inside direction changing passage 210A. The side cover 211 is formed with the direction changing passage outer peripheral portions 210a, 210a for both the direction changing passages 210A, 210B arranged vertically.

According to the second invention described above, since the rollers are circulated in a state of being retained by the roller chain, the rollers are rolled and moved in a state where center axes of the respective rollers are retained in parallel to each other by the roller chain. Therefore, the generation of skew can be contact angle line of the roller 203 is set to obliquely extend downwards and is formed so as to incline with an inclination angle of almost 45°.

FIG. 14 shows an example having a structure in which the upper row of rollers 203 among the two rows of the rollers 203 arranged vertically is formed so that a contact angle line L1 of the roller 203 is set to obliquely extend downwards from a side of the track rail to sides of the right and left suspending portions 2042, 2042 of the block body 2040 and is formed so as to incline with an inclination angle of almost 45° with respect to a horizontal line H, while the lower row of rollers 203 is formed so that a contact angle line L2 of the roller 203 is set to obliquely extend upwards and is formed so as to incline with an inclination angle of almost 45°.

In the case of this embodiment, the direction changing passages 210A, 210B of vertically arranged two rows of rollers 3 disposed to both end portions of the block body 2040 are arranged alternately with a predetermined interval in an axial direction so as to intersect to each other. In this case, the direction changing passage inner peripheral portion forming member 212 formed to the end surface of the block body 2040 is provided with the direction changing passage inner periphery portion 210b of the direction changing passage 210A of a side close to the block body 2040 and the prevented and the rollers can be smoothly rolled and moved.

In addition, since the roller chain is guided on a predetermined track through the roller chain guide portions formed to the roller returning passage and the direction changing passage, the rollers retained by the roller chain can be also accurately guided.

In addition, the running-out of the roller chain can be prevented by the roller chain guide portions.

In particular, when the roller returning passage to be formed with the roller chain guide portions, the roller returning passage forming member to be formed with the direction changing inner periphery portion and the direction changing passage inner periphery portion forming member are integrally molded with the block body, the roller chain guide portions can be accurately formed on the track.

In addition, when the direction changing passage inner periphery portion forming member is integrally formed with the block body, it becomes possible to eliminate the irregularities to be formed at the connected portion between the roller rolling surface and the direction changing passage inner periphery portion. In addition, as to the roller returning passage, when it is integrally formed with the block body, it also becomes possible to eliminate the irregularities to be formed at the connected portion between the direction changing passage inner periphery portion and the roller returning passage, whereby the rollers can be further smoothly circulated and moved in cooperation with the guiding function of the roller chain.

Furthermore, when the roller chain is formed so as to have an endless structure and is provided with a falling-out preventing portion for the rollers, the falling-out of the rollers can be prevented by the roller chain even if the movable block is detached from the track rail.

In addition, the roller chain is provided with a guide projecting portion, while the roller returning passage and the direction changing passage inner peripheral portion are provided with guide grooves. In addition, a side of the roller rolling surface in the loaded area is provided with a guide wall having the guide groove, and the guide wall is integrally molded with the block body by using an insert molding method, so that the roller chain can be accurately guided in all around the endless circulating passage, thus enabling the rollers to further smoothly circulate and move. According to the structure described above, when the roller chain is circulated and moved, the guide projecting portion is engaged with the guide groove formed to the roller returning passage and the direction changing passage inner peripheral portion, so that the run-out of the roller chain during the circulation is suppressed. As a result, the rollers can be rolled and moved in orderly arranged state in all around the endless circulating passage.

In addition, in a case where the roller chain is formed in a striped-shape having no connected portion at both ends thereof, when the movable block is detached from the track rail, the guide projecting portion is engaged with the guide groove, thus enabling to prevent a sagging or slack of an end portion of the roller chain. Further, also in the case of the roller chain having an endless structure, the sagging or slack of an intermediate portion of the roller chain can be prevented.

When the roller chain comprises spacer portions disposed between the adjacent rollers and connecting members for connecting the respective spacer portions, each of the rollers is arranged and circulated in a state where the rollers are retained by the spacer portions from back and forth in the arranging direction thereof.

Further, when a falling-out preventing portion for the roller is Provided to the spacer portion so as to prevent the roller falling-out from back and forth of the roller, it becomes unnecessary to chamfer the end portion of the roller, so that an effective length of the roller for bearing the load can be increased, thus enabling to improve the load bearing ability. Furthermore, since only the spacer portion is disposed between the adjacent rollers, a pitch of the rollers can be formed as small as possible, so that a number of the rollers required to be disposed per unit length for bearing the load can be increased as many as possible, thus further improving the load bearing ability of the roller.

In addition, when the roller is formed to have a hollow structure and the roller is retained by inserting a resin portion into the hollow portion of the roller, the falling-out of the roller can be securely prevented and a degree of parallelization between the adjacent rollers can be accurately maintained.

In addition, as an example of a case where the hollow portion does not penetrate, the roller may be retained in such a manner that a recessed portion is formed to both end portions of the roller and the resin portion is inserted into the recessed portion or in a manner that a grooved portion is formed to a center peripheral portion of the roller and the resin portion is fitted into the grooved portion.

In addition, when the roller chain is reinforced by inserting a wire or thin plate into the connecting member for linking the rollers, a fatigue strength and life duration of the roller chain can be increased.

In addition, at a time of the insert molding, when a block supporting portion having a shape obtained by cutting an outer peripheral portion of the roller with a cross section passing through a center axis of the roller is provided to an inner periphery of a molding die so as to correspond to the roller rolling surface of the block body, and the block body is positioned in the molding die by contacting the roller rolling surface to the block supporting portion, the burr would not occur at the roller rolling surfaces.

In particular, when the paired right and left roller rolling surfaces of the block body are supported by the block supporting portions of the molding die, the block body is clamped from every four directions and supported by the paired right and left block supporting portions at four points. Therefore, even if an injection pressure of a molding material is applied to the block body from every directions, the block body can be held unmoved, thus the block body can be accurately positioned.

Industrial Applicability

As described above, the linear roller guide device according to the present invention is widely applicable to linear guide mechanisms for various industrial equipments such as machine tool, robot operating system, measuring apparatus or the like.

What is claimed is:

1. A roller chain adapted to be mounted to a linear roller guide device including a track rail and a movable block assembled to the track rail through a number of rollers, comprising:

said roller chain being a belt-shaped member having flexibility in which said rollers are arranged in a shape of a chain, and said roller chain is adapted to be inserted to move in an endless circulation passage formed by a loaded area between a roller rolling surface of the movable block and a roller rolling surface of the track rail, direction changing passages and a roller returning passage;

a plurality of spacer portions disposed between respectively adjacent rollers so as to support the rollers; and a connection member connecting the respective spacer portions;

wherein each of the spacer portions has two sides being a concavo-concave shape and top and bottom sides being a rectangular shape and wherein each of the spacer portions has a plurality of concave portions having a spherical curvature that is the same as a spherical curvature of the rollers so as to complementally accommodate the rollers and the roller chain has two ends that are not connected.

2. A roller chain according to claim 1, wherein each of said rollers has an outer periphery contacting two adjacent spacers between which said each roller is disposed to be slidable, said rollers being aligned in parallel with each other by said spacers.

3. A roller chain according to claim 1, wherein each of said spacers is formed with an arcuate recessed portion having a shape corresponding to a circular outer peripheral surface of the roller disposed between the adjacent spacers.

4. A roller chain according to claim 1, wherein said connection member has both side portions in the roller axis direction and the side portions form projected guide portions projecting in the roller axis direction over the faces of the roller.

* * * * *